US012619697B2

(12) United States Patent
Shen et al.

(10) Patent No.: US 12,619,697 B2
(45) Date of Patent: May 5, 2026

(54) IDENTITY RECOGNITION METHOD AND APPARATUS, AND FEATURE EXTRACTION METHOD AND APPARATUS FOR BIOMETRIC PATTERN INFORMATION

(71) Applicant: TENCENT TECHNOLOGY (SHENZHEN) COMPANY LIMITED, Shenzhen (CN)

(72) Inventors: Lei Shen, Shenzhen (CN); Chuhan Zhou, Shenzhen (CN); Ruixin Zhang, Shenzhen (CN); Kai Zhao, Shenzhen (CN); Tao Wang, Shenzhen (CN); Yingyi Zhang, Shenzhen (CN); Shouhong Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 174 days.

(21) Appl. No.: 18/386,881

(22) Filed: Nov. 3, 2023

(65) Prior Publication Data

US 2024/0070248 A1    Feb. 29, 2024

Related U.S. Application Data

(63) Continuation of application No. PCT/CN2022/132147, filed on Nov. 16, 2022.

(30) Foreign Application Priority Data

Feb. 9, 2022    (CN) .......................... 202210122885.7

(51) Int. Cl.
*G06F 21/32*        (2013.01)
*G06V 10/42*        (2022.01)
(Continued)

(52) U.S. Cl.
CPC .............. *G06F 21/32* (2013.01); *G06V 10/42* (2022.01); *G06V 10/44* (2022.01); *G06V 10/54* (2022.01); *G06V 10/806* (2022.01)

(58) Field of Classification Search
CPC ........ G06F 21/32; G06V 10/42; G06V 10/44; G06V 10/54; G06V 10/806; G06V 10/454;
(Continued)

(56) References Cited

U.S. PATENT DOCUMENTS 8,565,497 B2 *  10/2013  Nada .................. G06V 40/1365
                                                        382/125
2015/0036894 A1 *  2/2015  Matsunami .......... G06V 10/449
                                                        382/115
(Continued)

FOREIGN PATENT DOCUMENTS

CN          101777128 A      7/2010
CN          105046205 A  *  11/2015  ......... G06V 40/1365
(Continued)

OTHER PUBLICATIONS

A. Meraoumia, S. Chitroub and A. Bouridane, "2D and 3D palmprint information and Hidden Markov Model for improved identification performance," 2011 11th International Conference on Intelligent Systems Design and Applications, Cordoba, Spain, 2011, pp. 648-653, doi: 10.1109/ISDA.2011.6121729. (Year: 2011).*
(Continued)

*Primary Examiner* — Noura Zoubair
*Assistant Examiner* — Lawrence Q Truong
(74) *Attorney, Agent, or Firm* — Anova Law Group, PLLC

(57)        ABSTRACT

An identity recognition method includes: acquiring biometric pattern information describing a biometric pattern of a first object; performing feature extraction on the biometric
(Continued)

pattern information to obtain a global pattern feature and a local pattern feature; fusing the global pattern feature and the local pattern feature to obtain a fused pattern feature of the first object; and performing identity recognition on the first object based on the fused pattern feature of the first object.

16 Claims, 10 Drawing Sheets

(51) Int. Cl.

| | | |
|---|---|---|
| *G06V 10/44* | (2022.01) | |
| *G06V 10/54* | (2022.01) | |
| *G06V 10/80* | (2022.01) | |

(58) Field of Classification Search
CPC .. G06V 10/82; G06V 40/1347; G06N 3/0464; G06N 3/08
See application file for complete search history.

(56) References Cited

U.S. PATENT DOCUMENTS

| | | |
|---|---|---|
| 2017/0255648 A1 | 9/2017 | Dube et al. |
| 2020/0320281 A1 | 10/2020 | Chen et al. |
| 2023/0368351 A1 | 11/2023 | Kudo |

FOREIGN PATENT DOCUMENTS

| | | |
|---|---|---|
| CN | 106529407 A | 3/2017 |
| CN | 112241664 A | 1/2021 |
| CN | 112580605 A | 3/2021 |
| CN | 113971822 A | 1/2022 |
| JP | 2021514497 A | 6/2021 |
| JP | 2021144749 A | 9/2021 |
| WO | 2021127841 A1 | 7/2021 |

OTHER PUBLICATIONS

Stoimchev, Marjan et al. "Learning to Combine Local and Global Image Information for Contactless Palmprint Recognition." Sensors (Basel, Switzerland) vol. 22,1 73. Dec. 23, 2021, doi:10.3390/s22010073 (Year: 2021).*

M. Yang et al., "DOLG: Single-Stage Image Retrieval with Deep Orthogonal Fusion of Local and Global Features," in 2021 IEEE/CVF International Conference on Computer Vision (ICCV), Montreal, QC, Canada, 2021, pp. 11752-11761, doi: 10.1109/ICCV48922. 2021.01156. (Year: 2021).*

The World Intellectual Property Organization (WIPO) International Search Report for PCT/CN2022/132147 Feb. 8, 2023 5 Pages (including translation).

The State Intellectual Property Office of the People's Republic of China (SIPO) Office Action 1 for 202210122885.7 Jun. 12, 2024 27 Pages (including translation).

Min Yang et al. "Dolg: Single-stage image retrieval with deep orthogonal fusion of local and global features." Proceedings of the IEEE/CVF International conference on Computer Vision. 2021.

Xiaoman Chen et al. "Palmprint Recognition Based on Fusing Global and Local Directional Features." Journal of Graphics 40.4 (2019): 671.

Dapeng Zhang et al., "Two novel characteristics in palmprint verification: datum point invariance and line feature matching." Pattern recognition 32.4 (1999): 691-702.

Guangming Lu et al., "Palmprint recognition using eigenpalms features." Pattern Recognition Letters 24.9-10 (2003): 1463-1467.

Ying Hao et al. "Multispectral palm image fusion for accurate contact-free palmprint recognition." 2008 15th IEEE International Conference on Image Processing. IEEE, 2008.

Joseph Redmon et al., "Yolov3: An incremental improvement." arXiv preprint arXiv:1804.02767 (2018).

Jiankang Deng et al. "Arcface: Additive angular margin loss for deep face recognition." Proceedings of the IEEE/CVF conference on computer vision and pattern recognition. 2019.

Angelo Genovese et al. "PalmNet: Gabor-PCA convolutional networks for touchless palmprint recognition." IEEE Transactions on Information Forensics and Security 14.12 (2019): 3160-3174.

The Japan Patent Office (JPO) Notice of Reasons for Refusal for Application No. 2024-525547 Mar. 18, 2025 10 Pages (including translation).

* cited by examiner

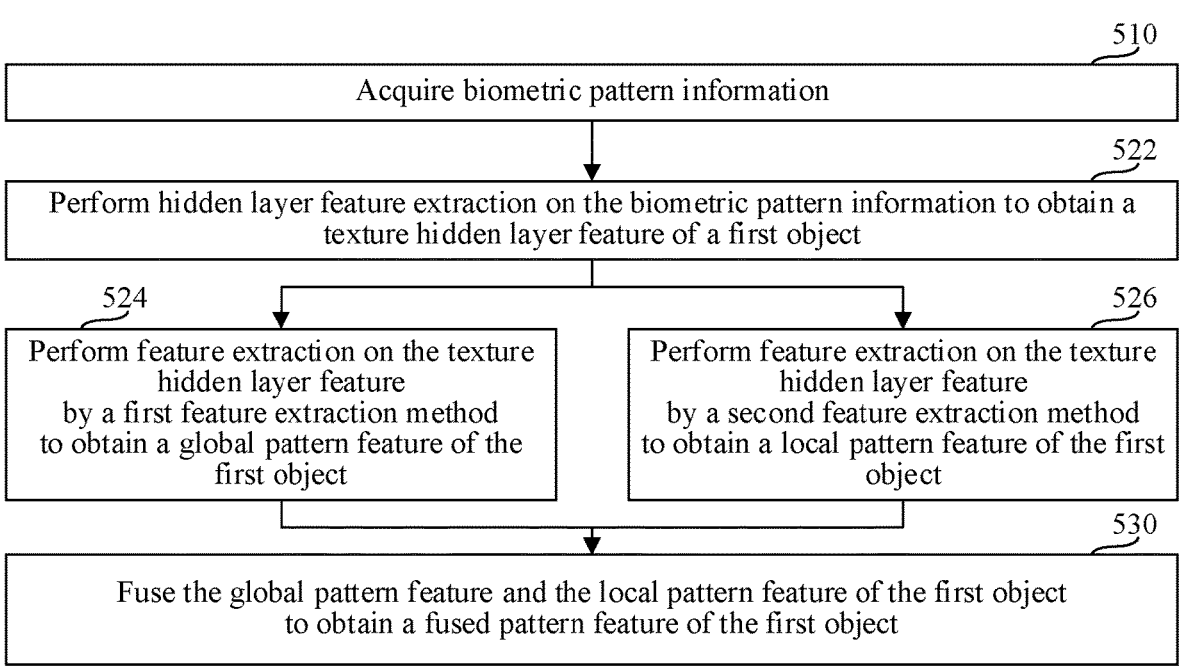

510

Acquire biometric pattern information

522

Perform hidden layer feature extraction on the biometric pattern information to obtain a texture hidden layer feature of a first object

524

Perform feature extraction on the texture hidden layer feature by a first feature extraction method to obtain a global pattern feature of the first object

526

Perform feature extraction on the texture hidden layer feature by a second feature extraction method to obtain a local pattern feature of the first object

530

Fuse the global pattern feature and the local pattern feature of the first object to obtain a fused pattern feature of the first object

FIG. 3

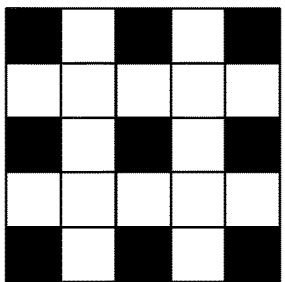

Dilated convolutional kernel with a convolutional kernel size of 3

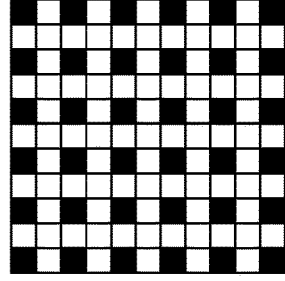

Dilated convolutional kernel with a convolutional kernel size of 6

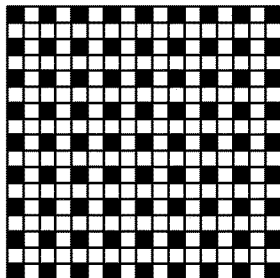

Dilated convolutional kernel with a convolutional kernel size of 9

Acquire biometric pattern information

520

Perform feature extraction on the biometric pattern information to obtain a global pattern feature and a local pattern feature

528

Perform self-attention mechanism processing on the local pattern feature to obtain an updated local pattern feature 530a Fuse the global pattern feature and the updated local pattern feature of a first object to obtain a fused pattern feature of the first object

FIG. 5

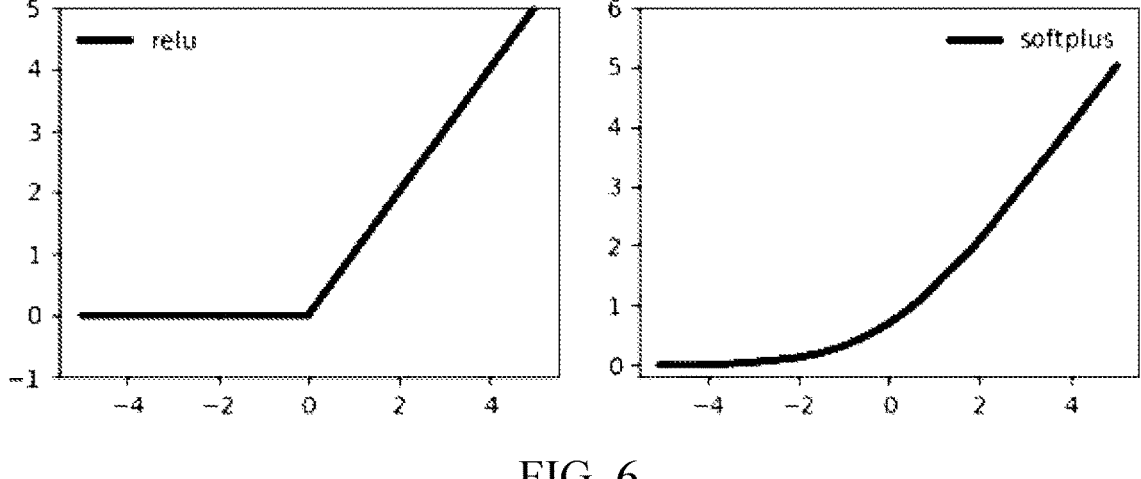

FIG. 6

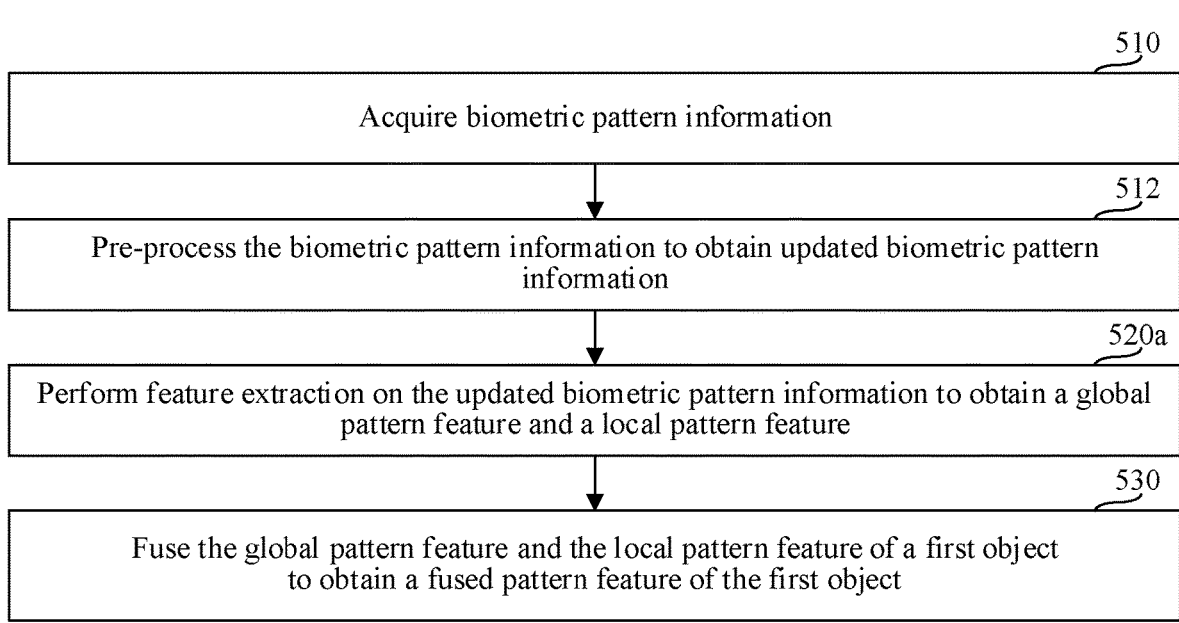

510

Acquire biometric pattern information

512

Pre-process the biometric pattern information to obtain updated biometric pattern information 520a Perform feature extraction on the updated biometric pattern information to obtain a global pattern feature and a local pattern feature

530

Fuse the global pattern feature and the local pattern feature of a first object to obtain a fused pattern feature of the first object

FIG. 7

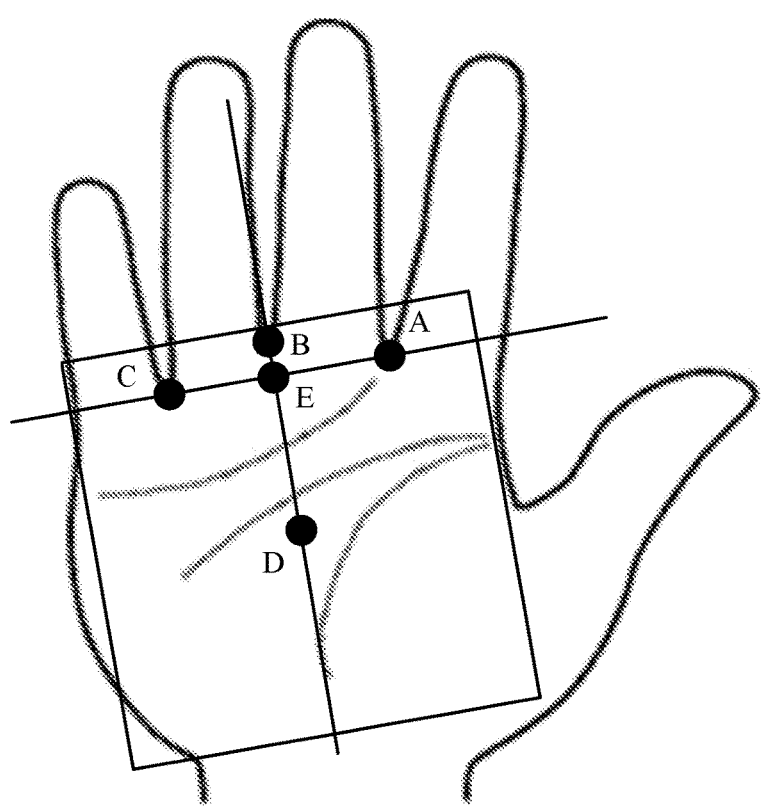

FIG. 8

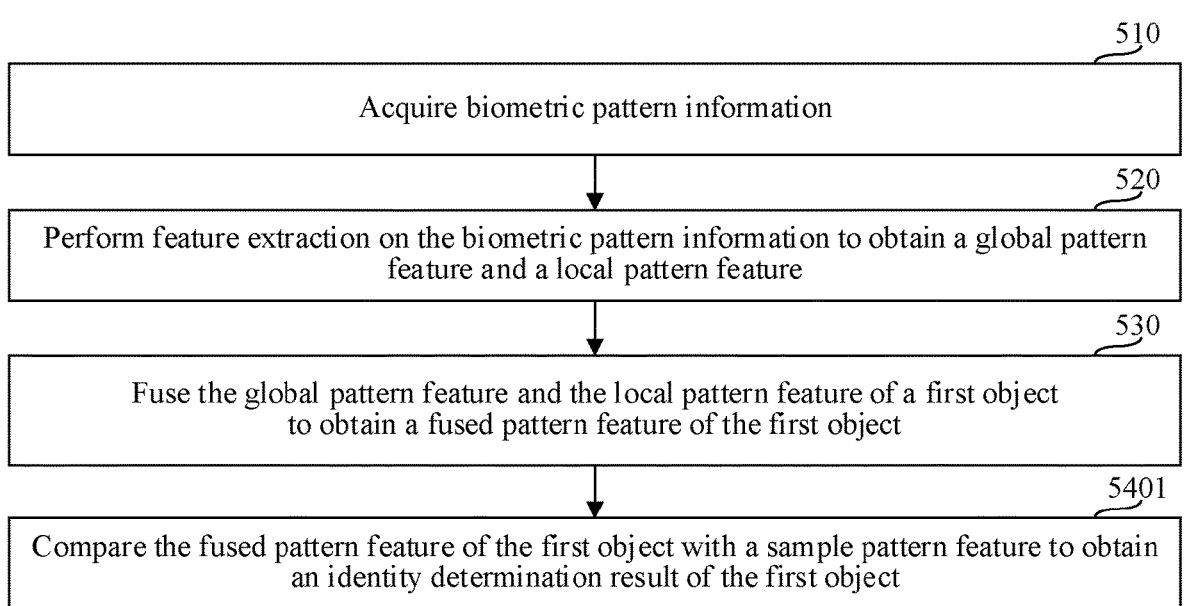

510

Acquire biometric pattern information

520

Perform feature extraction on the biometric pattern information to obtain a global pattern feature and a local pattern feature

530

Fuse the global pattern feature and the local pattern feature of a first object to obtain a fused pattern feature of the first object

5401

Compare the fused pattern feature of the first object with a sample pattern feature to obtain an identity determination result of the first object

Acquire sample pattern information and a sample pattern feature

720

Invoke an initial biometric pattern feature extraction model to process the sample pattern information and
output a predicted fused pattern feature of a sample object

730

Compare the predicted fused pattern feature with the sample pattern feature to obtain a feature prediction error

740

Perform error back propagation training on the initial biometric pattern feature extraction model by using the feature prediction error
to obtain a biometric pattern feature extraction model

FIG. 12

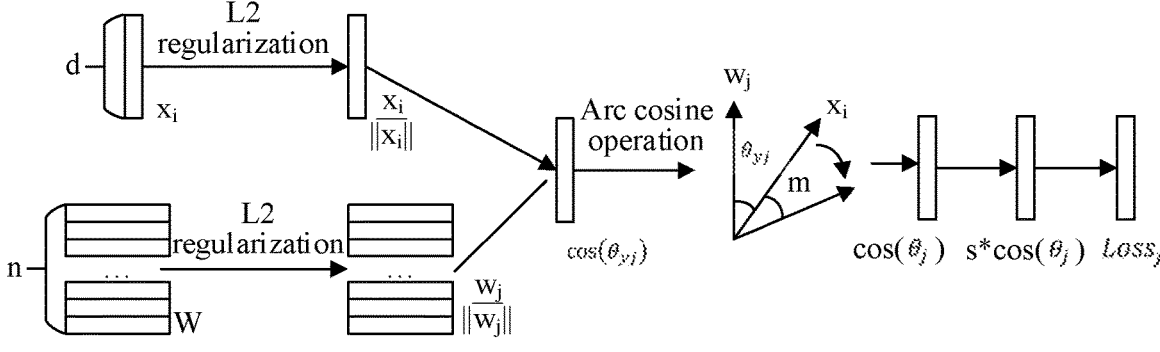

FIG. 13

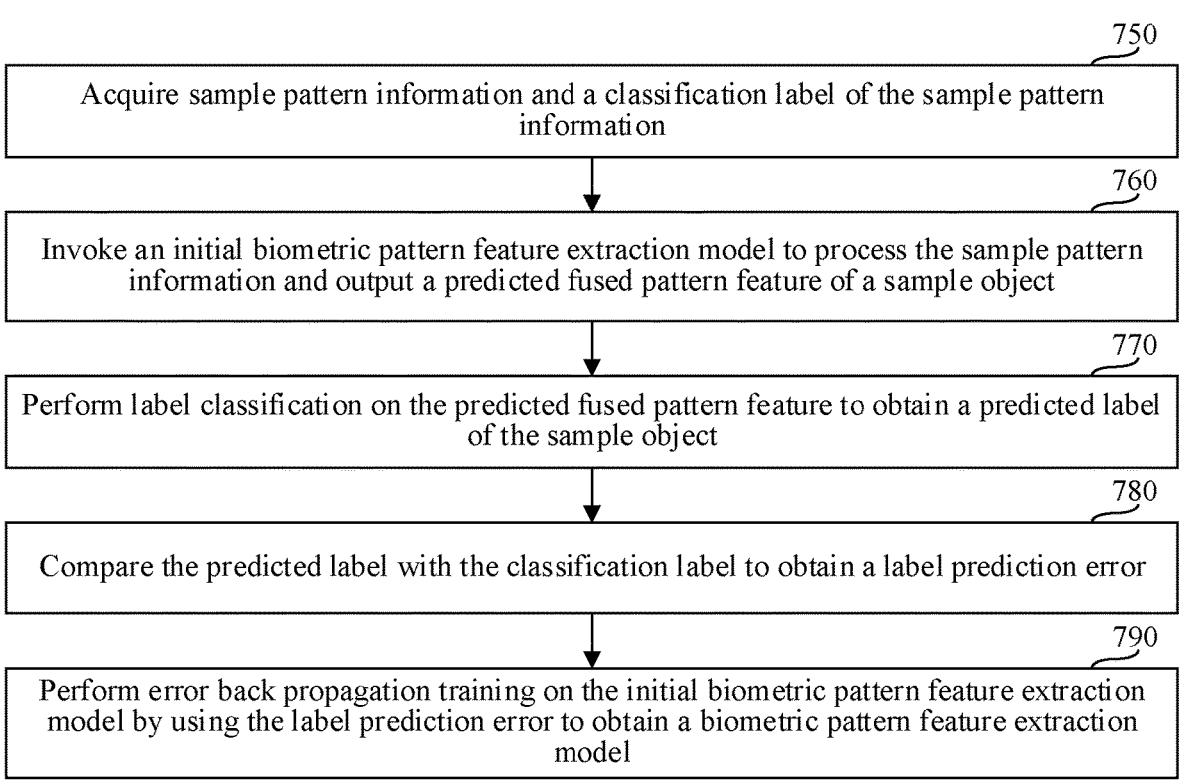

750

Acquire sample pattern information and a classification label of the sample pattern information

760

Invoke an initial biometric pattern feature extraction model to process the sample pattern information and output a predicted fused pattern feature of a sample object

770

Perform label classification on the predicted fused pattern feature to obtain a predicted label of the sample object

780

Compare the predicted label with the classification label to obtain a label prediction error

790

Perform error back propagation training on the initial biometric pattern feature extraction model by using the label prediction error to obtain a biometric pattern feature extraction model

FIG. 14

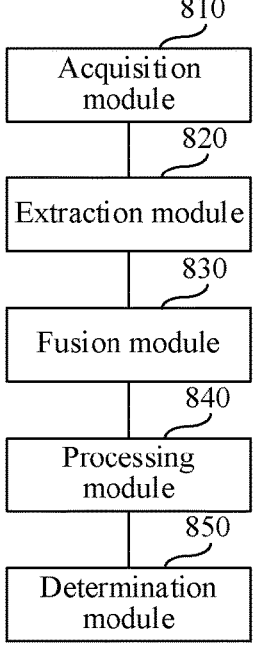

810
Acquisition module

820
Extraction module

830
Fusion module

840
Processing module

850
Determination module

FIG. 15

IDENTITY RECOGNITION METHOD AND APPARATUS, AND FEATURE EXTRACTION METHOD AND APPARATUS FOR BIOMETRIC PATTERN INFORMATION

CROSS-REFERENCES TO RELATED APPLICATIONS

This application is a continuation application of PCT Patent Application No. PCT/CN2022/132147, filed on Nov. 16, 2022, which claims priority to Chinese Patent Application No. 202210122885.7, on Feb. 9, 2022, all of which is incorporated herein by reference in their entirety.

FIELD OF THE TECHNOLOGY

The present disclosure relates to the field of identity recognition technologies and, in particular, to an identity recognition method and apparatus, a feature extraction method and apparatus for biometric pattern information, a device, and a storage medium.

BACKGROUND OF THE DISCLOSURE

With the development of computer technology, application scenarios of biometric pattern information recognition technology continue to expand and is widely used in attendance records, mobile payment, and other scenarios.

Biometric pattern information is often recognized by extracting deep feature of the biometric pattern information. During feature extraction, dimensionality reduction is performed on the high-dimensional biometric pattern information to obtain a low-dimensional biometric pattern feature for describing the biometric pattern information. After a comparison process on the biometric pattern features, biometric pattern information recognition is realized.

SUMMARY

According to an embodiment of the present disclosure, an identity recognition method is provided. The method includes: acquiring biometric pattern information describing a biometric pattern of a first object; performing feature extraction on the biometric pattern information to obtain a global pattern feature and a local pattern feature, the global pattern feature describing a global feature of the biometric pattern information of the first object, and the local pattern feature describing a local feature of the biometric pattern information of the first object; fusing the global pattern feature and the local pattern feature of the first object to obtain a fused pattern feature of the first object; and performing identity recognition on the first object based on the fused pattern feature of the first object.

According to an embodiment of the present disclosure, a computer device is provided. The computer device includes: one or more processors and a memory, the memory storing at least one program, and the one or more processor being configured to execute the at least one program to implement an identity recognition method by performing: acquiring biometric pattern information describing a biometric pattern of a first object; performing feature extraction on the biometric pattern information to obtain a global pattern feature and a local pattern feature, the global pattern feature describing a global feature of the biometric pattern information of the first object, and the local pattern feature describing a local feature of the biometric pattern information of the first object; fusing the global pattern feature and the local pattern feature of the first object to obtain a fused pattern feature of the first object; and performing identity recognition on the first object based on the fused pattern feature of the first object.

According to an embodiment of the present disclosure, a non-transitory computer-readable storage medium is provided and stores executable instructions that, when being executed, causes one or more processors to implement an identity recognition method by performing: acquiring biometric pattern information describing a biometric pattern of a first object; performing feature extraction on the biometric pattern information to obtain a global pattern feature and a local pattern feature, the global pattern feature describing a global feature of the biometric pattern information of the first object, and the local pattern feature describing a local feature of the biometric pattern information of the first object; fusing the global pattern feature and the local pattern feature of the first object to obtain a fused pattern feature of the first object; and performing identity recognition on the first object based on the fused pattern feature of the first object.

BRIEF DESCRIPTION OF THE DRAWINGS

In order to describe the technical solutions of the embodiments of the present disclosure more clearly, the following briefly introduces the accompanying drawings required for describing the embodiments. Apparently, the accompanying drawings in the following description show only some embodiments of the present disclosure, and those of ordinary skill in the art may still derive other drawings from these accompanying drawings without involving any creative effort.

FIG. 3 is a flowchart of a feature extraction method for biometric pattern information according to an exemplary embodiment of the present disclosure.

FIG. 4 is a schematic diagram of a dilated convolutional kernel according to an exemplary embodiment of the present disclosure.

FIG. 5 is a flowchart of a feature extraction method for biometric pattern information according to an exemplary embodiment of the present disclosure.

FIG. 6 is a schematic diagram of an ReLU function and a softplus function according to an exemplary embodiment of the present disclosure.

FIG. 7 is a flowchart of a feature extraction method for biometric pattern information according to an exemplary embodiment of the present disclosure.

FIG. 8 is a schematic diagram of an intercepted region of interest of biometric pattern information according to an exemplary embodiment of the present disclosure.

FIG. 9 is a flowchart of a feature extraction method for biometric pattern information according to an exemplary embodiment of the present disclosure.

FIG. 12 is a flowchart of a training method for a biometric pattern feature extraction model according to an exemplary embodiment of the present disclosure.

FIG. 13 is a schematic diagram of determination of a feature prediction error according to an exemplary embodiment of the present disclosure.

FIG. 14 is a flowchart of a training method for a biometric pattern feature extraction model according to an exemplary embodiment of the present disclosure.

FIG. 15 is a structural block diagram of a feature extraction apparatus for biometric pattern information according to an exemplary embodiment of the present disclosure.

Accompanying drawings herein are incorporated into this description and constitute a part of this description, show embodiments that conform to the present disclosure, and are used for describing a principle of the present disclosure together with this description.

DESCRIPTION OF EMBODIMENTS

In order to make the objectives, technical solutions, and advantages of the present disclosure clearer, the following further describes implementations of the present disclosure in detail with reference to the accompanying drawings.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

The terms used in the present disclosure are for the purpose of describing specific embodiments only and are not intended to limit the present disclosure. The singular forms of "a" and "the" used in the present disclosure and the appended claims are intended to include the plural forms as well, unless the context clearly indicates otherwise. The term "and/or" used herein indicates and includes any or all suitable combinations of one or more associated listed items. Although the terms "first", "second", and the like may be used in the present disclosure to describe various information, but the information shall not be limited to these terms. These terms are merely used to distinguish between information of the same type. For example, a first parameter may be referred to as a second parameter, and similarly, the second parameter may be referred to as the first parameter without departing from the scope of the present disclosure. Depending on the context, for example, the word "if" used herein may be interpreted as "while" or "when" or "in response to determination".

User information (including but not limited to user equipment information, user personal information, and the like) and data (including but not limited to data used for analysis, stored data, displayed data, and the like) involved in the present disclosure are authorized by users or information and data that have been fully authorized by all parties, and the collection, use, and processing of relevant data need to comply with relevant laws and regulations and standards of relevant countries and regions. For example, biometric pattern information involved in the present disclosure is acquired under full authorization.

Figure 1:
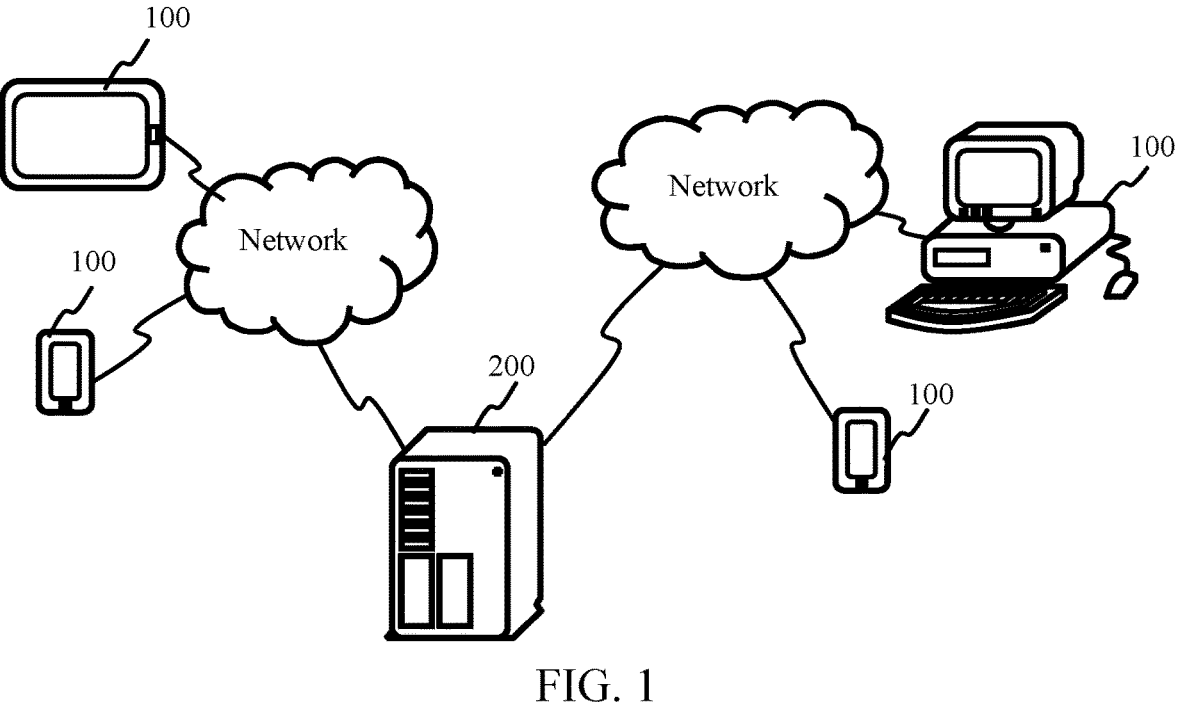
FIG. 1 is a schematic diagram of a computer system according to an exemplary embodiment of the present disclosure.

FIG. 1 is a schematic diagram of a computer system according to an exemplary embodiment of the present disclosure. The computer system may be implemented as a system architecture of a feature extraction method for biometric pattern information. The computer system may include: a terminal 100 and a server 200.

The terminal 100 may be an electronic device such as a mobile phone, a tablet computer, a vehicle-mounted terminal (vehicle machine), a wearable device, a personal computer (PC), an access control device, and a self-service terminal. A client of a target application program may be installed and run in the terminal 100. The target application program may be a mobile payment, attendance record or identity verification application program that supports biometric pattern information verification, or may be another application program that provides a feature extraction function for biometric pattern information. In addition, form of the target application program is not limited in the present disclosure. The target application program includes, but is not limited to, an application (App), an applet, and the like that is installed in the terminal 100, or may be in the form of a webpage.

The server 200 may be an independent physical server, or may be a server cluster or distributed system composed of a plurality of physical servers, or may be a cloud server providing a cloud computing service. The server 200 may be a backend server of the foregoing target application program and is configured to provide a backend service for the client of the target application program.

Steps of a feature extraction method for biometric pattern information according to an embodiment of the present disclosure may be performed by a computer device. The computer device refers to an electronic device with data computing, processing, and storage capabilities The solution implementation environment shown in FIG. 1 is taken as an example. The feature extraction method for biometric pattern information may be performed by the terminal 100 (for example, the feature extraction method for biometric pattern information is performed by the client of the target application program installed and run in the terminal 100), or the feature extraction method for biometric pattern information may be performed by the server 200, or the feature extraction method for biometric pattern information may be performed by the terminal 100 and the server 200 in an interactive and cooperative way. In addition, the technical solutions of the present disclosure may be combined with the blockchain technology. For example, some data (data such as biometric pattern information and identity information corresponding to biometric pattern information) involved in the feature extraction method for biometric pattern information of the present disclosure may be stored in the blockchain. The terminal 100 may communicate with the server 200 by using a network such as a wired or wireless network.

The ability of the related technology to recognize highly similar biometric pattern information, such as biometric pattern information of twins, is significantly low. Based on this, the present disclosure provides a feature extraction method and apparatus for biometric pattern information, a device, and a storage medium. Next, the feature extraction method for biometric pattern information will be described with reference to the following embodiments.

Figure 2:
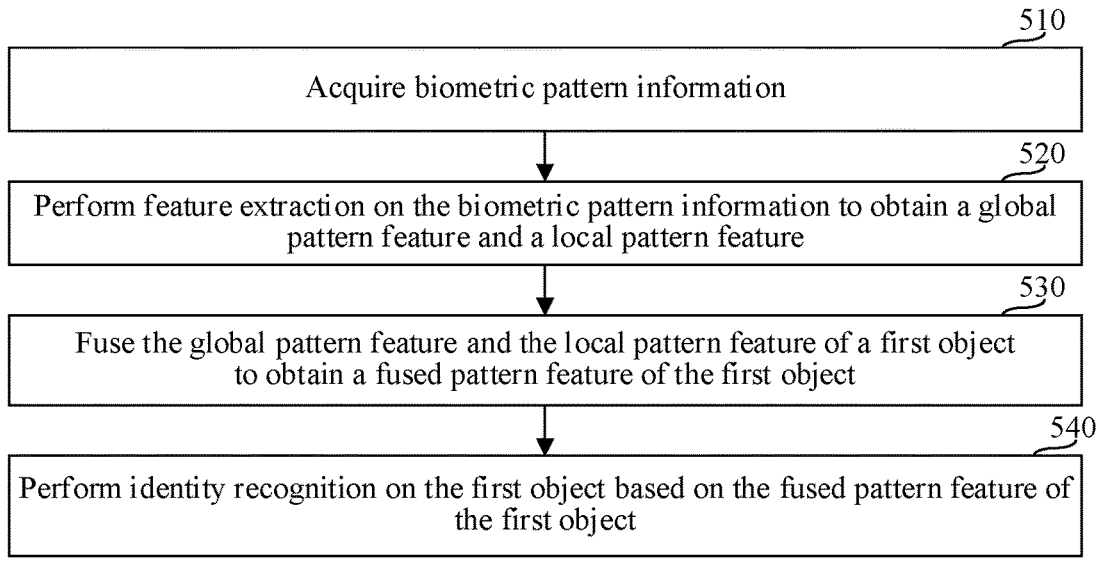
FIG. 2 is a flowchart of a feature extraction method for biometric pattern information according to an exemplary embodiment of the present disclosure.

FIG. 2 is a flowchart of an identity recognition method according to an exemplary embodiment of the present disclosure. The method may be performed by a computer device. The method includes:

Step 510: Acquire biometric pattern information.

The biometric pattern information describes a biometric pattern of a first object. In an embodiment of the present disclosure, a type of biometric pattern includes, but is not limited to, at least one of: a finger line, a palm line, an eye line, a face line, a blood vessel line, a lip line, and a mouth line. The present disclosure does not impose any restrictions on the type of biometric pattern.

In an embodiment of the present disclosure, a biometric pattern collection method includes, but is not limited to, at least one of: an optical collection method, such as a biometric pattern photo; a capacitive collection method, such as use of a capacitive pattern collection module; and a biological radio frequency collection method, such as collection of a biometric pattern by using an ultrasonic wave. The present disclosure does not impose any restrictions on the biometric pattern collection method.

Step 520: Perform feature extraction on the biometric pattern information to obtain a global pattern feature and a local pattern feature.

The global pattern feature describes a global feature of the biometric pattern information of the first object, and the local pattern feature describes a local feature of the biometric pattern information of the first object. In an embodiment of the present disclosure, the local pattern feature may be acquired based on the global pattern feature, or the local pattern feature and the global pattern feature may be acquired independently. No restrictions are imposed on this.

In the process of extracting features of the biometric pattern information, feature extraction may be performed on the biometric pattern information by invoking a biometric pattern feature extraction model; or feature extraction may be performed on the biometric pattern information by manual labeling; or the feature of the biometric pattern information may be extracted through operation of the biometric pattern information. The present disclosure does not impose any restrictions on this.

Exemplarily, an example in which feature extraction is performed on the biometric pattern information by using a biometric pattern feature extraction model is taken, the biometric pattern feature extraction model includes a feature extraction network, and the feature extraction network is invoked to perform feature extraction on the biometric pattern information so as to obtain the global pattern feature and the local pattern feature. The global pattern feature describes the global feature of the biometric pattern information of the first object, and the local pattern feature describes the local feature of the biometric pattern information of the first object.

Step 530: Fuse the global pattern feature and the local pattern feature of the first object to obtain a fused pattern feature of the first object.

Exemplarily, the fused pattern feature describes the global feature and the local feature of the biometric pattern information of the first object. In an embodiment of the present disclosure, a fusion method for the global pattern feature and the local pattern feature includes, but is not limited to, at least one of: orthogonal fusion, convolutional fusion, and adaptive feature fusion.

Similar to step 520, the present disclosure does not impose any restrictions on the fusion method. An example in which the global pattern feature and the local pattern feature are fused by using the biometric pattern feature extraction model is taken, the biometric pattern feature extraction model includes a feature fusion network, and the feature fusion network is invoked to fuse the global pattern feature and the local pattern feature of the first object so as to obtain the fused pattern feature of the first object.

Step 540: Perform identity recognition on the first object based on the fused pattern feature of the first object.

In conclusion, in the method according to this embodiment, feature extraction is performed on the biometric pattern information to obtain the local pattern feature, so that attention to the local detail feature of the biometric pattern is increased. The local pattern feature and the global pattern feature are fused, so that the ability of the pattern feature to describe palmprint information is improved, the dimension in which the pattern feature describes the palmprint information locally is expanded, and the accuracy of recognition of highly similar biometric pattern information is ensured.

FIG. 3 is a flowchart of an identity recognition method according to an exemplary embodiment of the present disclosure. The method may be performed by a computer device. That is, in some embodiments, step 520 in the embodiment shown in FIG. 2 may be implemented by the following two steps:

Step 522: Hidden layer feature extraction is performed on the biometric pattern information to obtain a texture hidden layer feature of the first object.

The texture hidden layer feature describes a hidden layer representation of target palmprint information. Exemplarily, a representation method for the texture hidden layer feature includes, but is not limited to, at least one of: a feature vector, a feature matrix, and a feature value.

Similar to step 520, the present disclosure does not impose any restrictions on the hidden layer feature extraction method. An example in which hidden layer feature extraction is performed on the biometric pattern information by using the biometric pattern feature extraction model is taken, the biometric pattern feature extraction model includes the feature extraction network, the feature extraction network includes a first residual convolutional block, and the first residual convolutional block is invoked to perform hidden layer feature extraction on the biometric pattern information so as to obtain the texture hidden layer feature of the first object. The texture hidden layer feature describes the hidden layer representation of the target palmprint information.

Exemplarily, the hidden layer feature extraction method for the biometric pattern information is a feature dimensionality reduction-based feature extraction method. In the process of performing hidden layer feature extraction by using the biometric pattern feature extraction model, the first residual convolutional block is invoked to realize hidden layer feature extraction.

In some embodiments, the first residual convolutional block includes, but is not limited to, at least one of the following network structures: a convolutional neural network (CNN), an efficient network, a transformer network, a deep residual network (ResNet), and an Inception-Resnet101.

Step 524: Perform feature extraction on the texture hidden layer feature by a first feature extraction method to obtain the global pattern feature of the first object.

The first feature extraction method is a feature dimensionality reduction-based feature extraction method. Exemplarily, the feature dimensionality is reduced by residual convolution.

Similar to step 520, the present disclosure does not impose any restrictions on the feature extraction method. An example in which hidden layer feature extraction is performed on the biometric pattern information by using the biometric pattern feature extraction model is taken, the biometric pattern feature extraction model includes the feature extraction network, the feature extraction network includes a second residual convolutional block, and the second residual convolutional block is invoked to perform feature extraction on the texture hidden layer feature by the first feature extraction method so as to obtain the global pattern feature of the first object. The first feature extraction method is a feature dimensionality reduction-based feature extraction method.

Step 526: Perform feature extraction on the texture hidden layer feature by a second feature extraction method to obtain the local pattern feature of the first object.

The second feature extraction method is a feature receptive field increase-based feature extraction method. Exemplarily, feature receptive fields are increased by dilated convolution.

Exemplarily, the feature receptive field indicates an information dimension of a texture hidden layer feature indicated by each feature value in the local pattern feature. Exemplarily, in the process of performing feature extraction on a first original image by using a first feature image, the feature receptive field represents a dimension of an original image pixel indicated by an image feature pixel in the first feature image.

Similar to step 520, the present disclosure does not impose any restrictions on the feature extraction method. An example in which hidden layer feature extraction is performed on the biometric pattern information by using the biometric pattern feature extraction model is taken, the biometric pattern feature extraction model includes the feature extraction network, the feature extraction network includes a dilated convolutional block, and the dilated convolutional block is invoked to perform feature extraction on the texture hidden layer feature by the second feature extraction method so as to obtain the local pattern feature of the first object. The second feature extraction method is a feature receptive field increase-based feature extraction method.

In some embodiments of the present disclosure, step 526 may be implemented by the following two sub-steps:

Sub-step 1: Respectively process the texture hidden layer feature by n second feature extraction methods to obtain n local sub-features of the first object.

n is a positive integer, and feature receptive fields of the n second feature extraction methods are different.

Similar to step 520, the present disclosure does not impose any restrictions on the feature extraction method. An example in which hidden layer feature extraction is performed on the biometric pattern information by using the biometric pattern feature extraction model is taken, the biometric pattern feature extraction model includes the feature extraction network, the feature extraction network includes a dilated convolutional block, the dilated convolutional block includes n dilated convolutional layers, and the n dilated convolutional layers are invoked to respectively process the texture hidden layer feature by n second feature extraction methods so as to obtain the n local sub-features of the first object. n is a positive integer, and feature receptive fields of the n second feature extraction methods are different. The feature receptive field is determined based on a size of a convolutional kernel of the dilated convolutional layer.

Sub-step 2: Splice the n local sub-features to obtain the local pattern feature of the first object.

When n is greater than 1, the local sub-features may be spliced directly from end to end, or may be superimposed and spliced mathematically.

When n is equal to 1, the local sub-feature is determined as the local feature of the first object.

Exemplarily, FIG. 4 is a schematic diagram of a dilated convolutional kernel according to an exemplary embodiment of the present disclosure. The schematic diagram of the dilated convolutional block shows a dilated convolutional kernel with a convolutional kernel size of 3, a dilated convolutional kernel with a convolutional kernel size of 6, and a dilated convolutional kernel with a convolutional kernel size of 9. A dimension of a feature receptive field of the dilated convolutional kernel with the convolutional kernel size of 3 is 5 by 5, a dimension of a feature receptive field of the dilated convolutional kernel with the convolutional kernel size of 6 is 11 by 11, and a dimension of a feature receptive field of the dilated convolutional kernel with the convolutional kernel size of 9 is 17 by 17.

In conclusion, in the method according to this embodiment, feature extraction is performed on the biometric pattern information, and the local pattern feature is obtained by the feature receptive field increase-based feature extraction method, so that attention to the local detail feature of the biometric pattern is increased. The local pattern feature and the global pattern feature are fused, so that the ability of the pattern feature to describe palmprint information is improved, the dimension in which the pattern feature describes the palmprint information locally is expanded, and the accuracy of recognition of highly similar biometric pattern information is ensured.

FIG. 5 is a flowchart of a feature extraction method for biometric pattern information according to an exemplary embodiment of the present disclosure. The method may be performed by a computer device. That is, in some embodiments, on the basis of the embodiment shown in FIG. 2, step 528 is further included.

Step 528: Perform self-attention mechanism processing on the local pattern feature to obtain an updated local pattern feature.

Exemplarily, self-attention mechanism processing is performed on the local pattern feature to enhance the weight of a local effective feature region, so as to obtain the updated local pattern feature.

Exemplarily, in some embodiments of the present disclosure, step 528 may be implemented by the following three sub-steps, that is, self-attention mechanism processing includes activation and regularization.

Sub-step 1: Activate the local pattern feature to obtain a second activated feature.

Exemplarily, an activation function used for activating the local pattern feature includes, but is not limited to, at least one of: a sigmoid function, a tanh function, a rectified linear unit (ReLU) function, a softmax function, and a softplus function. FIG. 6 is a schematic diagram of an ReLU function and a softplus function according to an exemplary embodiment of the present disclosure.

Exemplarily, the local pattern feature is activated by using the ReLU function and the softplus function to obtain the second activated feature. For example, $$x_{relu} = \text{Relu}(x) = \max(0, x); \text{ and}$$

$$x_{softplus} = \text{Softplus}(x_{relu}) = \log(1 + e^{x_{relu}}),$$

where, x represents the local pattern feature, Relu(.) represents the ReLU function, and max represents maximization operation, $x_{softplus}$ represents the second activated feature, and Softplus(.) represents the softplus function.

Exemplarily, the ReLU function may be used to enhance a non-linear relationship between neural network layers in the biometric pattern feature extraction model to avoid a simple linear relationship. Through maximization operation of the ReLU function, some local pattern features are outputted as 0 to cause sparsity of the network and reduce interdependence between the local pattern features, so as to reduce occurrence of overfitting. The softplus function acts the same as the ReLU function, and the softplus function is a smooth form of the ReLU function.

Sub-step 2: Regularize the local pattern feature to obtain a second regularized feature.

Exemplarily, a regularization method for the local pattern feature may be L1 regularization or L2 regularization. Exemplarily, the local pattern feature is regularized by L2 regularization to obtain the second regularized feature. For example, $$x_{L2norm} = L2norm(x) = \sqrt{\sum_{i=1}^{n} x_i^2},$$

where, $x_{L2norm}$ represents the second regularized feature, and L2norm represents L2 regularization.

Exemplarily, according to L2 regularization, a value of the second regularized feature is controlled to be between 0 and 1 by calculating a Euclidean distance to effectively prevent overfitting of the second regularized feature and improve the generalization of the model.

Sub-step 3: Multiply the second activated feature by the second regularized feature to obtain the updated local pattern feature of the first object.

In some embodiments of the present disclosure, before sub-step 1, the following steps are further included. The local pattern feature is standardized to obtain a second standardized feature.

Correspondingly, sub-step 1 is implemented as that the second standardized feature is regularized to obtain the second regularized feature, and Sub-step 2 is implemented as that the second standardized feature is regularized to obtain the second regularized feature.

The local pattern feature is standardized to ensure that the second standardized feature is distributed within a fixed interval, which lays a foundation for the model to quickly obtain a convergence result. Exemplarily, standardization of the local pattern feature is:

$$r_{mean} = \frac{1}{m} \sum_{k=1}^{m} x_i;$$

$$r_{std} = \frac{1}{m} \sum_{k=1}^{m} (x_i - r_{mean})^2;$$

$$x_{norm} = \frac{x_i - r_{mean}}{\sqrt{r_{std} + \varepsilon}}; \text{ and}$$

$$x_{BN} = \gamma \cdot x_{norm} + \beta,$$

where, $r_{mean}$ represents a feature mean value of the local pattern feature, x represents the local pattern feature, $x_i$ represents an $i^{th}$ feature value of the local pattern feature, m represents a quantity of features values of the local pattern feature, $r_{std}$ represents a feature standard deviation of the local pattern feature, $x_{norm}$ represents a normalized feature corresponding to the local pattern feature, $\varepsilon$ represents an additive variable used for avoiding the phenomenon that gradient return cannot be performed due to a variance of 0, $x_{BN}$ represents the second standardized feature, and $\gamma$ and $\beta$ represent network-learnable parameters and used for fitting a distribution of the second standardized feature.

Step 530a: Fuse the global pattern feature and the updated local pattern feature of the first object to obtain the fused pattern feature of the first object.

Exemplarily, the fused pattern feature describes the global feature and the local feature of the biometric pattern information of the first object. In an embodiment of the present disclosure, a fusion method for the global pattern feature and the local pattern feature includes, but is not limited to, at least one of: orthogonal fusion, convolutional fusion, and adaptive feature fusion.

Exemplarily, the global pattern feature and the updated local pattern feature of the first object are fused by orthogonal fusion to obtain the fused pattern feature of the first object:

$$feature_{local-global} = \frac{feature_{local} * feature_{global}}{|feature_{local}| * |feature_{global}|} * feature_{global},$$

where, $feature_{local-global}$ represents the fused pattern feature, $feature_{global}$ represents the global pattern feature, and $feature_{local}$ represents the updated local pattern feature.

In conclusion, in the method according to this embodiment, feature extraction is performed on the biometric pattern information to obtain the local pattern feature, so that attention to the local detail feature of the biometric pattern is increased. The weight of the local effective feature region is enhanced through self-attention mechanism processing. The local pattern feature and the global pattern feature are fused, so that the ability of the pattern feature to describe palmprint information is improved, the dimension in which the pattern feature describes the palmprint information locally is expanded, and the accuracy of recognition of highly similar biometric pattern information is ensured.

FIG. 7 is a flowchart of a feature extraction method for biometric pattern information according to an exemplary embodiment of the present disclosure. The method may be performed by a computer device. That is, in some embodiments, on the basis of the embodiment shown in FIG. 2, step 512 is further included.

Step 512: Pre-process the biometric pattern information to obtain updated biometric pattern information.

Exemplarily, a pre-processing method includes, but is not limited to, at least one of:

interpolation for the biometric pattern information. Exemplarily, the biometric pattern information is interpolated to change a dimension of the biometric pattern information; and a region of interest (ROI) of the biometric pattern information is intercepted. Exemplarily, the intercepted region of interest of the biometric pattern information is used for delineating a key region.

Exemplarily, the biometric pattern information is interpolated to change the dimension of the biometric pattern information, so that the biometric pattern information is changed into a target dimension. For example, the biometric pattern information is interpolated, so that the biometric pattern information is processed into a feature matrix with a dimension of 224 by 224.

Exemplarily, this embodiment does not impose any restrictions on a method for intercepting the region of interest of the biometric pattern information. The region of interest may be determined based on calculation rules, or the region of interest may be determined by using an interest region extraction network.

FIG. 8 is a schematic diagram of an intercepted region of interest of biometric pattern information according to an exemplary embodiment of the present disclosure. An example in which the biometric pattern information is palm pattern image information is taken, a first key point A, a second key point B, and a third key point C are extracted from the palm pattern image information. The first key point A is a gap point between the second finger and the third finger of the palm. The second key point B is a gap point between the third finger and the fourth finger of the palm. The third key point C is gap point between the fourth finger and the fifth finger of the palm.

A rectangular coordinate system is established in the palm pattern image information. A direction from the third key point C to the first key point A is determined as a positive direction of the x-axis, a perpendicular intersection point E with the x-axis direction is determined based on the second key point B, and a direction from the perpendicular intersection point E to the second key point B is determined as a positive direction of the y-axis. A palm point D is determined by extending from the perpendicular intersection point E along a negative direction of the y-axis, and a region of interest of the palm pattern image information is determined by taking the palm point D as a central point. The region of interest of the palm pattern image information is usually square. However, the possibility that the region of interest of the palm pattern image information is in a shape of a rectangle, circle, fan or the like is not excluded. Exemplarily, a distance between the palm point D and the perpendicular intersection point E is six-fifths of a distance between the first key point A and the third key point C. The region of interest of the palm pattern image information is a square region whose central point is the palm point D and side length is three-seconds of the distance between the first key point A and the third key point C.

Step 520*a*: Perform feature extraction on the updated biometric pattern information to obtain the global pattern feature and the local pattern feature.

The global pattern feature describes the global feature of the biometric pattern information of the first object, and the local pattern feature describes the local feature of the biometric pattern information of the first object. In an embodiment of the present disclosure, the local pattern feature may be acquired based on the global pattern feature, or the local pattern feature and the global pattern feature may be acquired independently. No restrictions are imposed on this.

In conclusion, in the method according to this embodiment, feature extraction is performed on the biometric pattern information to obtain the local pattern feature, so that attention to the local detail feature of the biometric pattern is increased. Pre-processing lays a foundation for acquisition of the local pattern feature. The local pattern feature and the global pattern feature are fused, so that the ability of the pattern feature to describe palmprint information is improved, the dimension in which the pattern feature describes the palmprint information locally is expanded, and the accuracy of recognition of highly similar biometric pattern information is ensured.

FIG. 9 is a flowchart of an identity recognition method according to an exemplary embodiment of the present disclosure. The method may be performed by a computer device. That is, in some embodiments, step 540 in the embodiment shown in FIG. 2 may be step 5401.

Step 5401: Compare the fused pattern feature of the first object with a sample pattern feature to obtain an identity determination result of the first object.

The sample pattern feature describes a biometric pattern information feature of a target object. The identity determination result of the first object indicates whether the first object and the target object belong to the same identity.

Exemplarily, a comparison method for the fused pattern feature of the first object and the sample pattern feature includes, but is not limited to, at least one of: calculation of a cosine similarity, calculation of a Euclidean distance, calculation of a covariance distance, and calculation of a Chebyshev distance.

In some embodiments of the present disclosure, step 540 may be implemented by the following sub-steps:

a cosine similarity between the fused pattern feature and the sample pattern feature is calculated.

Exemplarily, calculation of the cosine similarity includes:

$$sim(vector_{reg}, vector_{rec}) = \frac{vector_{reg} \times vector_{rec}}{\|vector_{reg}\| \times \|vector_{rec}\|},$$

where, $sim(vector_{reg}, vector_{rec})$ represents the cosine similarity, $vector_{rec}$ represents the fused pattern feature, $vector_{reg}$ represents the sample pattern feature, and $\| \ \|$ represents 1-norm operation.

When the cosine similarity satisfies an identity determination condition, the identity determination result shows that the first object is the target object.

When the cosine similarity does not satisfy the identity determination condition, the identity determination result shows that the first object is not the target object.

Exemplarily, the identity determination condition is that the cosine similarity is higher than a target threshold. The target threshold may be set according to experience, or may be obtained during training.

In conclusion, in the method according to this embodiment, feature extraction is performed on the biometric pattern information to obtain the local pattern feature, so that attention to the local detail feature of the biometric pattern is increased. The pattern features are compared to complete identity determination. The dimension in which the pattern feature describes palmprint information locally is expanded, and the accuracy of recognition of highly similar biometric pattern information is ensured.

Figure 10:
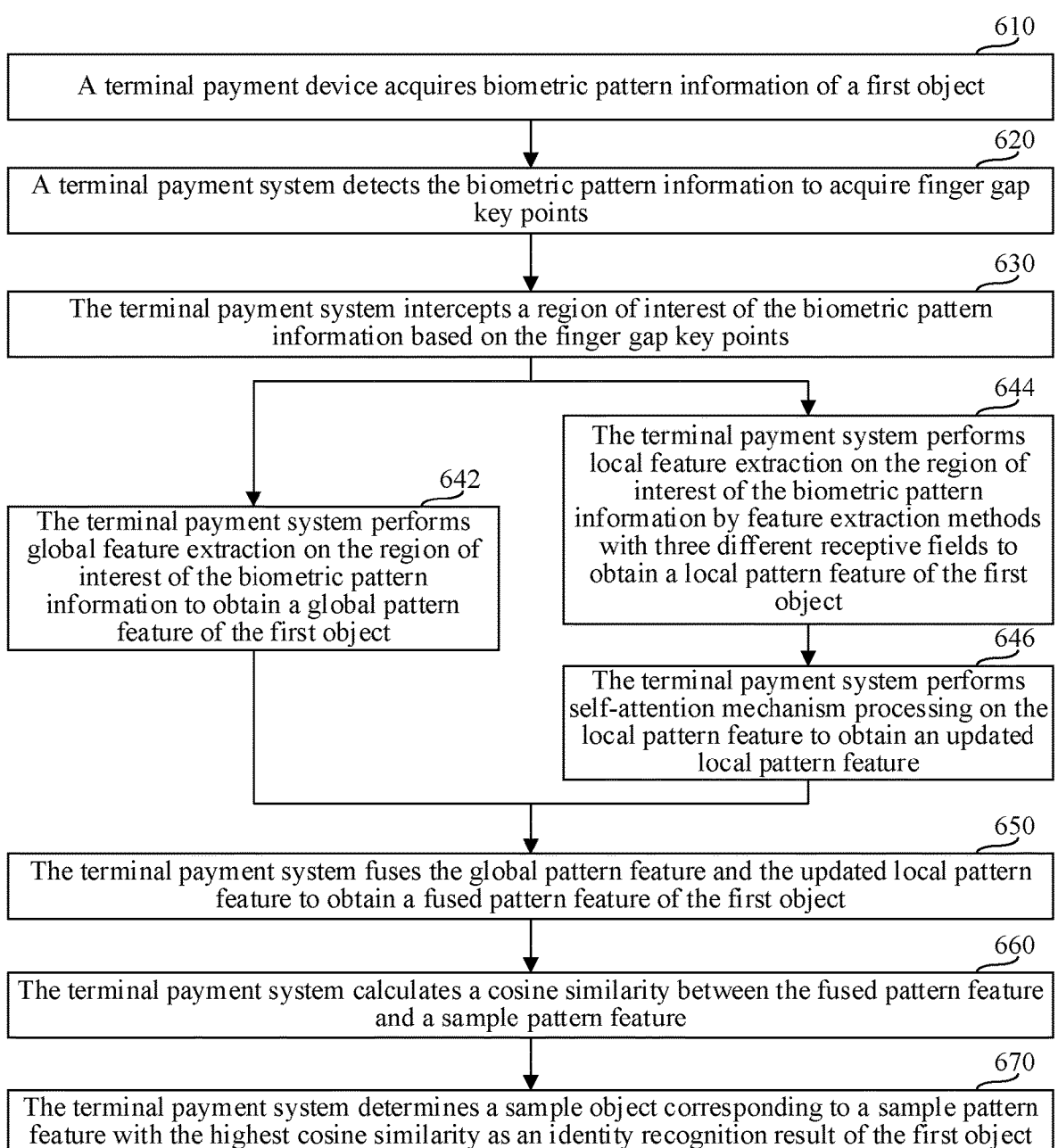
FIG. 10 is a flowchart of a biometric pattern information-based identity recognition method according to an exemplary embodiment of the present disclosure.

Various embodiments may include application of a feature extraction method for biometric pattern information to the field of mobile payment. FIG. 10 is a flowchart of a biometric pattern information-based identity recognition method according to an exemplary embodiment of the present disclosure. The method may be performed by a computer device.

Step 610: A terminal payment device acquires biometric pattern information of a first object.

The biometric pattern information describes a biometric pattern of the first object. In an embodiment of the present disclosure, a type of biometric pattern includes, but is not limited to, at least one of: a finger line, a palm line, an eye line, a face line, a blood vessel line, a lip line, and a mouth line. In this embodiment, an example in which the biometric pattern is a palm line is used for description purposes. The biometric pattern information includes palm pattern image information.

Step 620: A terminal payment system detects the biometric pattern information to obtain finger gap key points.

Exemplarily, the finger gap key points are used for establishment of a rectangular coordinate system in the palm pattern image information. A region of interest of the palm pattern image information is intercepted based on the established rectangular coordinate system.

In this embodiment, step 620 may be performed by the terminal payment device in the terminal payment system, or may be performed by a terminal payment server in the terminal payment system.

Similarly to the operation of Step 620, no restrictions are imposed on the operation manner of steps 630 to 670.

Step 630: The terminal payment system intercepts a region of interest of the biometric pattern information based on the finger gap key points.

The terminal payment system intercepts the region of interest of the biometric pattern information based on the rectangular coordinate system established based on the finger gap key points.

Step 642: The terminal payment system performs global feature extraction on the region of interest of the biometric pattern information to obtain a global pattern feature of the first object.

Exemplarily, global feature extraction is performed on the region of interest of the biometric pattern information by a feature dimensionality reduction-based feature extraction method. Specifically, a residual convolutional block is invoked to realize global feature extraction so as to obtain the global pattern feature of the first object.

Step 644: The terminal payment system performs local feature extraction on the region of interest of the biometric pattern information by feature extraction methods with three different receptive fields to obtain a local pattern feature of the first object.

Exemplarily, local feature extraction is performed on the region of interest of the biometric pattern information by a feature receptive field increase-based feature extraction method. Specifically, a dilated convolutional block is invoked to realize local feature extraction so as to obtain the local pattern feature of the first object.

Step 646: The terminal payment system performs self-attention mechanism processing on the local pattern feature to obtain an updated local pattern feature.

Self-attention mechanism processing is performed on the local pattern feature to enhance the weight of a local effective feature region, so as to obtain the updated local pattern feature.

Exemplarily, in some embodiments of the present disclosure, self-attention mechanism processing includes one or more processes of standardization, activation, and/or regularization.

Step 650: The terminal payment system fuses the global pattern feature and the updated local pattern feature to obtain a fused pattern feature of the first object.

Exemplarily, the fused pattern feature describes the global feature and the local feature of the biometric pattern information of the first object. Specifically, the global pattern feature and the updated local pattern feature are fused by orthogonal fusion to obtain the fused pattern feature of the first object.

Step 660: The terminal payment system calculates a cosine similarity between the fused pattern feature and a sample pattern feature.

Exemplarily, the cosine similarity refers to a similarity, which is indicated by cosine of an included angle between vectors, between the fused pattern feature and the sample pattern feature.

Step 670: The terminal payment system determines a sample object corresponding to a sample with the highest cosine similarity as an identity recognition result of the first object.

The cosine similarities are sorted from high to low, and the sample pattern feature with the highest cosine similarity represents that the similarity between the sample pattern feature and the fused pattern feature is the highest. The sample object corresponding to the sample pattern feature is determined as the identity recognition result of the first object.

In conclusion, in the method according to this embodiment, feature extraction is performed on the biometric pattern information to obtain the local pattern feature, so that attention to the local detail feature of the biometric pattern is increased. The local pattern feature and the global pattern feature are fused, so that the ability of the pattern feature to describe palmprint information is improved, the dimension in which the pattern feature describes the palmprint information locally is expanded, and the accuracy of recognition of highly similar biometric pattern information is ensured.

Figure 11:
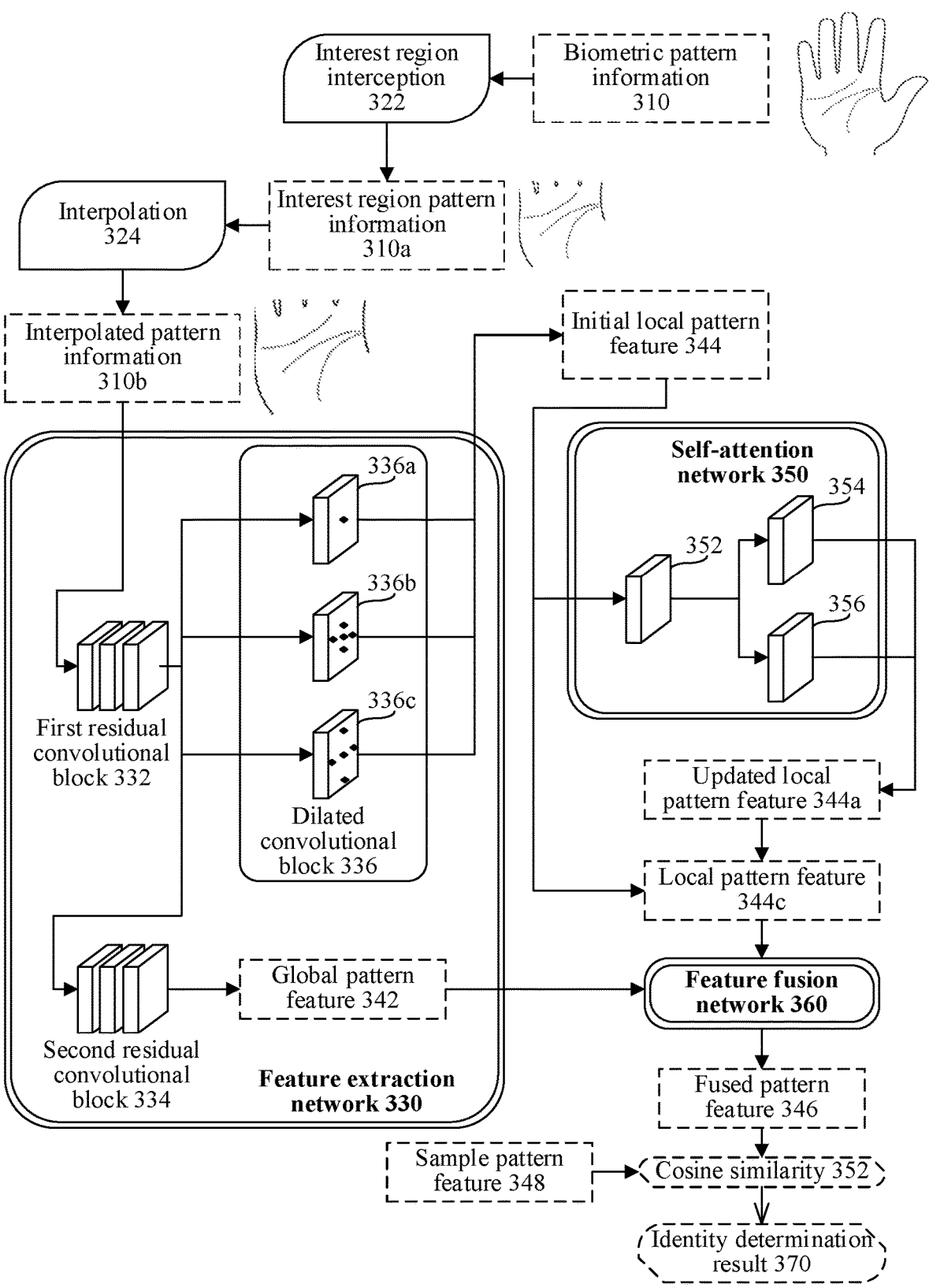
FIG. 11 is a schematic structural diagram of a biometric pattern feature extraction model according to an exemplary embodiment of the present disclosure.

Various embodiments of the present disclosure may include a biometric pattern feature extraction model. It is described in the embodiment shown in FIG. 2 that the identity recognition method may be performed by using a biometric pattern feature extraction model. FIG. 11 is a schematic structural diagram of a biometric pattern feature extraction model according to an exemplary embodiment of the present disclosure.

The biometric pattern feature extraction model includes: a feature extraction network 330, a self-attention network 350, and a feature fusion network 360.

Interest region interception 322 is performed on a biometric pattern feature 310 to obtain interest region pattern information 310a, and interpolation 324 is performed on the interest region pattern information 310a to obtain an interpolated pattern information 310b. Exemplarily, the interpolated pattern information 310b is a feature matrix with a dimension of 224 by 224.

The feature extraction network 330 includes: a first residual convolutional block 332, a second residual convolutional block 334, and a dilated convolutional block 336.

The first residual convolutional block 332 is invoked to process the interpolated pattern information 310b so as to obtain a texture hidden layer feature. Exemplarily, the texture hidden layer feature is a feature matrix with a dimension of 28 by 28. The first residual convolutional block 332 includes three convolutional layers. A dimension of a feature matrix outputted by the residual convolutional layer is a quarter of a dimension of an input feature matrix. That is, a first residual convolutional layer is invoked to process the interpolated pattern information 310b, and a feature matrix with a dimension of 112 by 112 is outputted. A second residual convolutional layer is invoked to process the foregoing feature matrix, and a feature matrix with a dimension of 56 by 56 is outputted. A third residual convolutional layer is invoked to process the foregoing feature matrix, and a feature matrix with a dimension of 28 by 28 is outputted.

The second residual convolutional block 332 is invoked to process the texture hidden layer feature so as to obtain a global pattern feature 342. Exemplarily, the global pattern feature 342 is a feature matrix with a dimension of 14 by 14.

The dilated convolutional block 336 includes: a first dilated convolutional layer 336a, a second dilated convolutional layer 336b, and a third dilated convolutional layer 336c.

The first dilated convolutional layer 336a is invoked to process the texture hidden layer feature so as to obtain a first local sub-feature. A size of a dilated convolutional kernel of the first dilated convolutional layer 336a is 3. The second dilated convolutional layer 336b is invoked to process the texture hidden layer feature so as to obtain a second local sub-feature. A size of a dilated convolutional kernel of the second dilated convolutional layer 336b is 6. The third dilated convolutional layer 336c is invoked to process the texture hidden layer feature so as to obtain a third local sub-feature. A size of a dilated convolutional kernel of the third dilated convolutional layer 336c is 9.

The first local sub-feature, the second local sub-feature, and the third local sub-feature are spliced to obtain an initial local pattern feature 344.

The self-attention network 350 includes: a standardization layer 352, an activation layer 354, and a regularization layer 356.

The standardization layer is invoked to process the initial local pattern feature 344 so as to ensure that an updated local pattern feature 344a is distributed within a fixed interval, which lays a foundation for the model to quickly obtain a convergence result.

The activation layer 354 and the regularization layer 356 are respectively invoked to activate and regularize the standardized local pattern feature. The processing results are multiplied to obtain the updated local pattern feature 344a.

The updated local pattern feature 344a is multiplied by the initial local pattern feature 344 to obtain a local pattern feature 344c.

The feature fusion network 360 is invoked to fuse the global pattern feature 342 and the local pattern feature 344c of the first object so as to obtain a fused pattern feature 346 of the first object.

A cosine similarity 352 between the fused pattern feature 346 and a sample pattern feature 348 is calculated.

An identity determination result 370 of the first object is determined based on the cosine similarity 352.

When the cosine similarity 352 satisfies an identity determination condition, the identity determination result 370 shows that the first object is a target object.

When the cosine similarity 352 does not satisfy the identity determination condition, the identity determination result 370 shows that the first object is not the target object.

An embodiment of the present disclosure provides a feature extraction method for biometric pattern information. The method is performed by using a biometric pattern feature extraction model in a computer device. The biometric pattern feature extraction model includes a feature extraction network and a feature fusion network. The method includes: biometric pattern information is acquired, and the biometric pattern information describes a biometric pattern of a first object; the feature extraction network is invoked to perform feature extraction on the biometric pattern information so as to obtain a global pattern feature and a local pattern feature, the global pattern feature describes a global feature of the biometric pattern information of the first object, and the local pattern feature describes a local feature of the biometric pattern information of the first object; and the feature fusion network is invoked to fuse the global pattern feature and the local pattern feature of the first object so as to obtain a fused pattern feature of the first object.

FIG. 12 is a flowchart of a training method for a biometric pattern feature extraction model according to an exemplary embodiment of the present disclosure. The method may be performed by a computer device. The method includes:

Step 710: Acquire sample pattern information and a sample pattern feature.

The sample pattern information describes a biometric pattern of a sample object, and the sample pattern feature is a biometric pattern feature corresponding to the sample pattern information of the sample object.

In an embodiment of the present disclosure, a type of biometric pattern includes, but is not limited to, at least one of: a finger line, a palm line, an eye line, a face line, a blood vessel line, a lip line, and a mouth line. The present disclosure does not impose any restrictions on the type of biometric pattern.

Step 720: Invoke an initial biometric pattern feature extraction model to process the sample pattern information and output a predicted fused pattern feature of the sample object.

Exemplarily, the predicted fused pattern feature describes a global feature and a local feature of the biometric pattern information of the sample object.

Step 730: Compare the predicted fused pattern feature with the sample pattern feature to obtain a feature prediction error.

The sample pattern feature is a biometric pattern feature corresponding to the sample pattern information of the sample object.

Exemplarily, the feature prediction error is a loss function of a softmax function of the predicted fused pattern feature and the sample pattern feature.

Specifically, obtaining of the feature prediction error includes:

$$\frac{x_i}{\|x_i\|} = L2norm(x_i);$$

$$\frac{w_j}{\|w_j\|} = L2norm(w_j);$$

$$\cos(\theta_{yj}) = \frac{x_i}{\|x_i\|} * \frac{w_j}{\|w_j\|};$$

$$\theta_{yj} = \arccos(\cos(\theta_{yj}));$$

$$\cos(\theta_j) = \cos(\theta_{yj} + m); \text{ and}$$

$$Loss_j = \text{Softmax}(s * \cos(\theta_j)) = \frac{e^{s*\cos(\theta_j)}}{\Sigma_j e^{s*\cos(\theta_j)}},$$

where, $x_i$ represents the predicted fused pattern feature, i represents a dimension of the predicted fused pattern feature, L2norm represents L2 regularization, $w_j$ represents the sample pattern feature, j represents a dimension of the sample pattern feature, a dimension of w is n by d, n represents a total quantity of classes of sample pattern features, arccos represents arc cosine operation, m represents a customized additive angle, exemplarily, m=0.5, s represents a feature amplification factor, exemplarily, s=48, $Loss_j$ represents the feature prediction error, and Softmax(.) represents the softmax function. Exemplarily, FIG. 13 is a schematic diagram of determination of a feature prediction error according to an exemplary embodiment of the present disclosure.

Step 740: Perform error back propagation training on the initial biometric pattern feature extraction model by using the feature prediction error to obtain a biometric pattern feature extraction model.

The purpose of performing error back propagation training on the initial biometric pattern feature extraction model is to minimize the feature prediction error between the predicted fused pattern feature and the sample pattern feature. The biometric pattern feature extraction model is obtained by training the initial biometric pattern feature extraction model.

In conclusion, in the method according to this embodiment, error back propagation training is performed on the initial biometric pattern feature extraction model to fuse the local pattern feature and the global pattern feature, which lays a foundation for improvement of the ability of the pattern feature to describe palmprint information. An example in which the biometric pattern information is palm pattern image information is taken, and the biometric pattern feature extraction model achieves a good training effect. Table 1 shows identity recognition results of a disclosed set including clear and blurred palm pattern image information of forty twins. Left hands/right hands of the same twins are taken as a sample pair. For 3,600 sample pairs, the biometric pattern feature extraction model does not make a mistake for clear palm pattern image information, and only makes one error for blurred palm pattern image information. Compare with the conventional model in the related technology that makes 37 mistakes for clear palm pattern image information and 46 mistakes for blurred palm pattern image information, the biometric pattern feature extraction model of the present disclosure has made significant progress.

TABLE 1

| Method/Quantity of mistakenly recognized sample pairs | Clear palm pattern image information | Blurred palm pattern image information |
| --- | --- | --- |
| Conventional model | 37 | 46 |
| Biometric pattern feature extraction model | 0 | 1 |

FIG. 14 is a flowchart of a training method for a biometric pattern feature extraction model according to an exemplary embodiment of the present disclosure. The method may be performed by a computer device. The method includes:

Step 750: Acquire sample pattern information and a classification label of the sample pattern information.

The sample pattern information describes a biometric pattern of a sample object, and the classification label indicates the sample object.

In an embodiment of the present disclosure, a type of biometric pattern includes, but is not limited to, at least one of: a finger line, a palm line, an eye line, a face line, a blood vessel line, a lip line, and a mouth line. The present disclosure does not impose any restrictions on the type of biometric pattern.

Step 760: Invoke an initial biometric pattern feature extraction model to process the sample pattern information and output a predicted fused pattern feature of the sample object.

Exemplarily, the predicted fused pattern feature describes a global feature and a local feature of the biometric pattern information of the sample object.

Step 770: Perform label classification on the predicted fused pattern feature to obtain a predicted label of the sample object.

Exemplarily, in this embodiment, label classification may be performed by invoking a label prediction model, so as to realize label classification for the predicted fused pattern feature; or label classification may be performed by manual labeling; or operation is performed on the predicted fused pattern feature to obtain the predicted label of the sample object. This embodiment does not impose any restrictions on the implementation method for label classification.

Step 780: Compare the predicted label with the classification label to obtain a label prediction error.

The classification label indicates the sample object. Exemplarily, the label prediction error includes at least one of the following loss functions of the predicted label and the classification label: a zero-one loss function, an absolute loss function, and a logarithmic loss function.

Step 790: Perform error back propagation training on the initial biometric pattern feature extraction model by using the label prediction error to obtain the biometric pattern feature extraction model.

The purpose of performing error back propagation training on the initial biometric pattern feature extraction model is to minimize the label prediction error between the predicted label and the classification label. The biometric pattern feature extraction model is obtained by training the initial biometric pattern feature extraction model.

In conclusion, in the method according to this embodiment, error back propagation training is performed on the initial biometric pattern feature extraction model to fuse the local pattern feature and the global pattern feature, which lays a foundation for improvement of the ability of the pattern feature to describe palmprint information.

Those of ordinary skill in the art may understand that the foregoing embodiments may be implemented independently, or the foregoing embodiments may be combined freely to obtain new embodiments for implementing the feature extraction method for biometric pattern information of the present disclosure.

FIG. 15 is a block diagram of an identity recognition apparatus according to an exemplary embodiment of the present disclosure. The apparatus includes: an acquisition module 810, configured to acquire biometric pattern information, the biometric pattern information being used for describing a biometric pattern of a first object; an extraction module 820, configured to perform feature extraction on the biometric pattern information to obtain a global pattern feature and a local pattern feature, the global pattern feature being used for describing a global feature of the biometric pattern information of the first object, and the local pattern feature being used for describing a local feature of the biometric pattern information of the first object; a fusion module 830, configured to fuse the global pattern feature and the local pattern feature of the first object to obtain a fused pattern feature of the first object; and a determination module 850, configured to perform identity recognition on the first object based on the fused pattern feature of the first object.

In some embodiments of the present disclosure, the extraction module 820 is further configured to: perform hidden layer feature extraction on the biometric pattern information to obtain a texture hidden layer feature of the first object, the texture hidden layer feature being used for describing a hidden layer representation of target palmprint information, perform feature extraction on the texture hidden layer feature by a first feature extraction method to obtain the global pattern feature of the first object, the first feature extraction method being a feature dimensionality reduction-based feature extraction method, and perform feature extraction on the texture hidden layer feature by a second feature extraction method to obtain the local pattern feature of the first object, the second feature extraction method being a feature receptive field increase-based feature extraction method.

In some embodiments of the present disclosure, the extraction module 820 is further configured to: respectively process the texture hidden layer feature by n second feature extraction methods to obtain n local sub-features of the first object, n being a positive integer, and feature receptive fields of the n second feature extraction methods being different, and splice the n local sub-features to obtain the local pattern feature of the first object.

In some embodiments of the present disclosure, the apparatus further includes: a processing module 840, configured to perform self-attention mechanism processing on the local pattern feature to obtain an updated local pattern feature.

The fusion module 830 is further configured to fuse the global pattern feature and the updated local pattern feature of the first object to obtain the fused pattern feature of the first object.

In some embodiments of the present disclosure, self-attention mechanism processing includes activation and regularization.

The processing module 840 is further configured to: activate the local pattern feature to obtain a second activated feature, regularize the local pattern feature to obtain a second regularized feature, and multiply the second activated feature by the second regularized feature to obtain the updated local pattern feature of the first object.

In some embodiments of the present disclosure, the apparatus further includes: a processing module 840, configured to pre-process the biometric pattern information to obtain updated biometric pattern information. A pre-processing method includes, but is not limited to, at least one of: interpolation for the biometric pattern information; and interception of a region of interest of the biometric pattern information.

The extraction module 820 is further configured to perform feature extraction on the updated biometric pattern information to obtain the global pattern feature and the local pattern feature.

In some embodiments of the present disclosure, the apparatus further includes: a determination module 850, configured to compare the fused pattern feature of the first object with a sample pattern feature to obtain an identity determination result of the first object. The sample pattern feature describes a biometric pattern information feature of a target object.

In some embodiments of the present disclosure, the determination module 850 is further configured to: calculate a cosine similarity between the fused pattern feature and the sample pattern feature, when the cosine similarity satisfies an identity determination condition, obtain the identity determination result showing that the first object is the target object, and when the cosine similarity does not satisfy the identity determination condition, obtain the identity determination result showing that the first object is not the target object.

Figure 16:
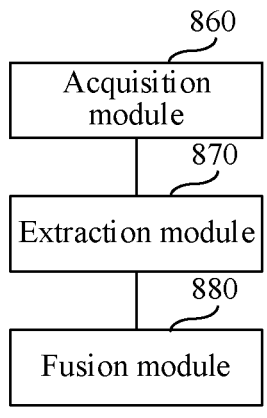
FIG. 16 is a structural block diagram of a feature extraction apparatus for biometric pattern information according to an exemplary embodiment of the present disclosure.

FIG. 16 is a block diagram of a feature extraction apparatus for biometric pattern information according to an exemplary embodiment of the present disclosure. The apparatus includes a biometric pattern feature extraction model. The biometric pattern feature extraction model includes a feature extraction network and a feature fusion network.

The apparatus includes: an acquisition module 860, configured to acquire biometric pattern information, the biometric pattern information being used for describing a biometric pattern of a first object; an extraction module 870, configured to invoke the feature extraction network to perform feature extraction on the biometric pattern information so as to obtain a global pattern feature and a local pattern feature, the global pattern feature being used for describing a global feature of the biometric pattern information of the first object, and the local pattern feature being used for describing a local feature of the biometric pattern information of the first object; and a fusion module 880, configured to invoke the feature fusion network to fuse the global pattern feature and the local pattern feature of the first object so as to obtain a fused pattern feature of the first object.

In some embodiments of the present disclosure, the feature extraction network includes: a first residual convolutional block, a second residual convolutional block, and a dilated convolutional block. The extraction module 870 is further configured to: invoke the first residual convolutional block to perform hidden layer feature extraction on the biometric pattern information so as to obtain a texture hidden layer feature of the first object, the texture hidden layer feature being used for describing a hidden layer representation of target palmprint information, invoke the second residual convolutional block to perform feature extraction on the texture hidden layer feature by a first feature extraction method so as to obtain the global pattern feature of the first object, the first feature extraction method being a feature dimensionality reduction-based feature extraction method, and invoke the dilated convolutional block to perform feature extraction on the texture hidden layer feature by a second feature extraction method so as to obtain the local pattern feature of the first object, the second feature extraction method being a feature receptive field increase-based feature extraction method.

In some embodiments of the present disclosure, the dilated convolutional block includes n dilated convolutional layers. The extraction module 870 is further configured to: invoke the n dilated convolutional layers to respectively process the texture hidden layer feature by n second feature extraction methods so as to obtain n local sub-features of the first object, n being a positive integer, feature receptive fields of the n second feature extraction methods being different, and the feature receptive field being determined based on a size of a convolutional kernel of the dilated convolutional layer, and splice the n local sub-features to obtain the local pattern feature of the first object.

In some embodiments of the present disclosure, the biometric pattern feature extraction model is obtained by the following training method. Sample pattern information and a sample pattern feature are acquired. The sample pattern information describes a biometric pattern of a sample object, and the sample pattern feature is a biometric pattern feature corresponding to the sample pattern information of the sample object.

An initial biometric pattern feature extraction model is invoked to process the sample pattern information and output a predicted fused pattern feature of the sample object.

The predicted fused pattern feature is compared with the sample pattern feature to obtain a feature prediction error.

Error back propagation training is performed on the initial biometric pattern feature extraction model by using the feature prediction error to obtain the biometric pattern feature extraction model.

In some embodiments of the present disclosure, the biometric pattern feature extraction model is obtained by the following training method. Sample pattern information and a classification label of the sample pattern information are acquired. The sample pattern information describes a biometric pattern of a sample object, and the classification label indicates the sample object.

An initial biometric pattern feature extraction model is invoked to process the sample pattern information and output a predicted fused pattern feature of the sample object.

Label classification is performed on the predicted fused pattern feature to obtain a predicted label of the sample object.

The predicted label is compared with the classification label to obtain a label prediction error.

Error back propagation training is performed on the initial biometric pattern feature extraction model by using the label prediction error to obtain the biometric pattern feature extraction model.

When the apparatus according to the foregoing embodiments implements the functions of the apparatus, only division of the foregoing function modules is used as an example for description. In the practical application, the foregoing functions may be allocated to and completed by different function modules according to actual requirements. That is, an internal structure of the device is divided into different function modules, to complete all or some of the functions described above.

The specific manners of performing operations by the various modules of the apparatuses in the foregoing embodiments are described in detail in the embodiments related to the methods. The technical effects achieved by the operations performed by various modules are the same as those in the embodiments of the methods, and will not be described in detail herein.

An embodiment of the present disclosure further provides a computer device. The computer device includes: a processor and a memory. The memory stores a computer program. The processor is configured to execute the computer program in the memory to implement the feature extraction method for biometric pattern information according to the foregoing method embodiments.

Figure 17:
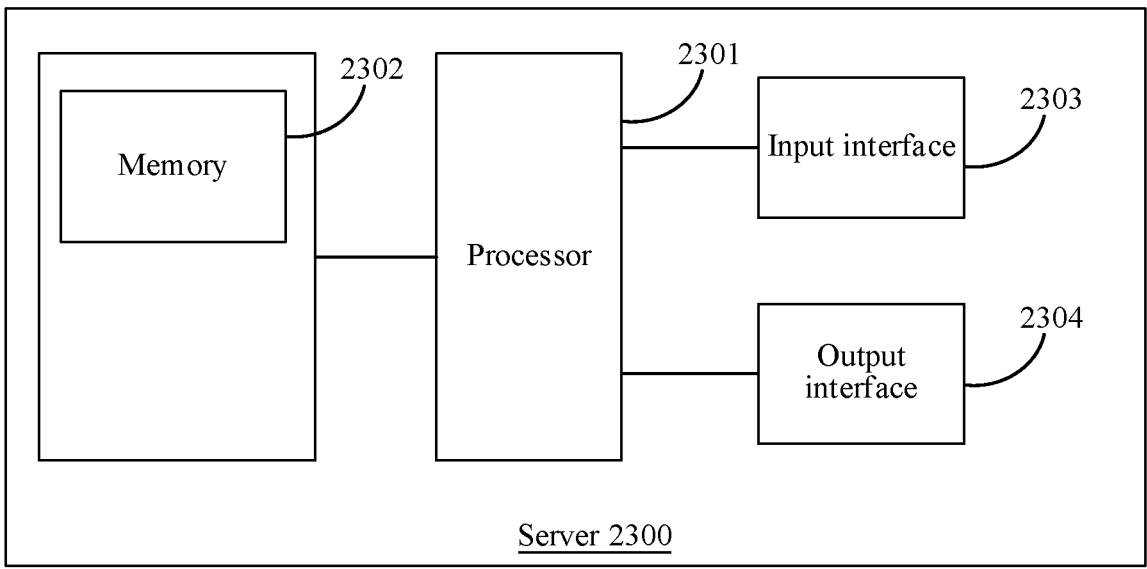
FIG. 17 is a structural block diagram of a server according to an exemplary embodiment of the present disclosure.

In some embodiments, the computer device may be a server. Exemplarily, FIG. 17 is a structural block diagram of a server according to an exemplary embodiment of the present disclosure.

The server 2300 includes: a processor 2301 and a memory 2302.

The processor 2301 may include one or more processing cores, for example, a 4-core processor or an 8-core processor. The processor 2301 may be implemented in at least one hardware form of a digital signal processor (DSP), a field-programmable gate array (FPGA), and a programmable logic array (PLA). The processor 2301 may also include a main processor and a co-processor. The main processor is a processor configured to process data in an awake state, and is also referred to as a central processing unit (CPU). The co-processor is a low power consumption processor configured to process data in a standby state. In some embodiments, the processor 2301 may be integrated with a graphics processing unit (GPU). The GPU is configured to render and draw content that needs to be displayed on a display screen. In some embodiments, the processor 2301 may further include an artificial intelligence (AI) processor. The AI processor is configured to process computing operations related to machine learning. The memory 2302 may include one or more computer-readable storage media. The computer-readable storage medium may be non-transient. The memory 2302 may further include a high-speed random access memory and a non-volatile memory, for example, one or more disk storage devices or flash storage devices. In some embodiments, the non-transient computer-readable storage medium in the memory 2302 is configured to store at least one instruction. The at least one instruction is executed by the processor 2301 to implement the feature extraction method for biometric pattern information according to the method embodiments of the present disclosure.

In some embodiments, the server 2300 further includes: an input interface 2303 and an output interface 2304. The processor 2301, the memory 2302, the input interface 2303, and the output interface 2304 may be connected through a bus or a signal cable. Each peripheral device may be connected to the input interface 2303 and the output interface 2304 through a bus, a signal cable or a circuit board. The input interface 2303 and the output interface 2304 may be configured to connect at least one peripheral device related to input/output (I/O) to the processor 2301 and the memory 2302. In some embodiments, the processor 2301, the memory 2302, the input interface 2303, and the output interface 2304 are integrated on the same chip or circuit board. In some embodiments, any one or two of the processors 2301, the memory 2302, the input interface 2303, and the output interface 2304 may be implemented on a single chip or circuit board.

Those skilled in the art may understand that the foregoing structure constitutes no limitation on the server 2300, and the server may include more or fewer components than those shown in the figure, or some components may be combined, or a different component deployment may be used.

In an exemplary embodiment, a chip is further provided. The chip includes a programmable logic device and/or program instructions. When the chip runs on a computer device, the feature extraction method for biometric pattern information according to the foregoing aspect is implemented.

In an exemplary embodiment, a computer program product or computer program is further provided. The computer program product or computer program includes computer instructions. The computer instructions are stored in a computer-readable storage medium. A processor of a computer device reads the computer instructions from the computer-readable storage medium and executes the computer instructions to implement the feature extraction method for biometric pattern information according to the foregoing method embodiments.

In an exemplary embodiment, a computer-readable storage medium is further provided. The computer-readable storage medium stores a computer program. The computer program is loaded and executed by a processor to implement the feature extraction method for biometric pattern information according to the foregoing method embodiments.

Those of ordinary skill in the art may understand that all or some of the steps of the foregoing embodiments may be implemented by hardware, or may be implemented by a program instructing relevant hardware. The program may be stored in a computer-readable storage medium. The storage medium mentioned above may be a read-only memory, a magnetic disk, an optical disc, or the like.

The term module (and other similar terms such as sub-module, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Those skilled in the art may be aware that in the foregoing one or more examples, the functions described in the embodiments of the present disclosure may be implemented by hardware, software, firmware, or any combination thereof. When implemented by using software, the functions may be stored in a computer-readable medium or may be taken as one or more instructions or code in a computer-readable medium for transmission. The computer-readable medium includes a computer storage medium and a communication medium. The communication medium includes any medium that enables a computer program to be transmitted from one place to another. The storage medium may be any available medium accessible to a general-purpose or dedicated computer. The foregoing descriptions are merely some embodiments of the present disclosure, but are not intended to limit the present disclosure. Any modification, equivalent replacement, and improvement made without departing from the spirit and principle of the present disclosure shall fall within the scope of protection of the present disclosure.

What is claimed is:

1. An identity recognition method, performed by a computer device and comprising:

acquiring biometric pattern information describing a biometric pattern of a first object, the biometric pattern information including palm pattern image information;

obtaining a plurality of finger gap key points based on the biometric pattern information, wherein the plurality of finger gap key points comprise a first key point, a second key point, and a third key point, the first key point is between an index finger and a middle finger of a palm, the second key point is between the middle finger and a ring finger of the palm, and the third key point is between the ring finger and a little finger of the palm;

establishing a rectangular coordinate system in the biometric pattern information, wherein a direction from the third key point to the first key point is a positive direction of an x-axis of the rectangular coordinate system, a direction from an intersection point where a line perpendicular to the x-axis passing through the second key point intersects the x-axis to the second key point as a positive direction of a y-axis of the rectangular coordinate system;

determining a central point on the y-axis in a negative y-axis direction, wherein the central point is located on the negative y-axis direction at a particular ratio of a distance from the first key point to the third key point;

determining a region of interest in the biometric pattern information based on the central point, the central point being at a center of the region of interest;

extracting information in the region of interest to obtain updated biometric pattern information;

performing feature extraction on the updated biometric pattern information to obtain a global pattern feature and a local pattern feature, the global pattern feature describing a global feature of the updated biometric pattern information of the first object, and the local pattern feature describing a local feature of the updated biometric pattern information of the first object;

fusing the global pattern feature and the local pattern feature of the first object to obtain a fused pattern feature of the first object; and performing identity recognition on the first object based on the fused pattern feature of the first object by comparing the fused pattern feature of the first object with a sample pattern feature to obtain an identity determination result of the first object, the sample pattern feature being used for describing a biometric pattern information feature of a target object, wherein comparing the fused pattern feature of the first object with the sample pattern feature comprises:

calculating a cosine similarity between the fused pattern feature and the sample pattern feature;

obtaining, in response to the cosine similarity satisfying an identity determination threshold, the identity determination result that the first object is the target object; and obtaining, in response to the cosine similarity not satisfying the identity determination threshold, the identity determination result that the first object is not the target object.

2. The method according to claim 1, wherein performing the feature extraction on the biometric pattern information to obtain the global pattern feature and the local pattern feature comprises:

performing hidden layer feature extraction on the biometric pattern information to obtain a texture hidden layer feature of the first object, the texture hidden layer feature describing a hidden layer representation of target palmprint information;

performing feature extraction on the texture hidden layer feature by a first feature extraction method to obtain the global pattern feature of the first object, the first feature extraction method including a feature dimensionality reduction-based feature extraction method; and performing feature extraction on the texture hidden layer feature by a second feature extraction method to obtain the local pattern feature of the first object, the second feature extraction method including a feature receptive field increase-based feature extraction method.

3. The method according to claim 2, wherein performing the feature extraction on the texture hidden layer feature by the second feature extraction method to obtain the local pattern feature of the first object comprises:

respectively processing the texture hidden layer feature by n second feature extraction methods to obtain n local sub-features of the first object, n being a positive integer, and feature receptive fields of the n second feature extraction methods being different; and splicing the n local sub-features to obtain the local pattern feature of the first object.

4. The method according to claim 1, comprising:

performing self-attention mechanism processing on the local pattern feature to obtain an updated local pattern feature, wherein fusing the global pattern feature and the local pattern feature of the first object to obtain the fused pattern feature of the first object comprises:

fusing the global pattern feature and the updated local pattern feature of the first object to obtain the fused pattern feature of the first object.

5. The method according to claim 4, wherein the self-attention mechanism processing comprises an activation process and a regularization process; and performing the self-attention mechanism processing on the local pattern feature to obtain the updated local pattern feature comprises:

activating the local pattern feature to obtain a second activated feature;

regularizing the local pattern feature to obtain a second regularized feature; and multiplying the second activated feature by the second regularized feature to obtain the updated local pattern feature of the first object.

6. The method according to claim 1, further comprising:
performing interpolation for the biometric pattern information.

7. A computer device, comprising:
one or more processors and a memory, the memory storing at least one program, and the one or more processor being configured to execute the at least one program to implement an identity recognition method by performing:

acquiring biometric pattern information describing a biometric pattern of a first object, the biometric pattern information including palm pattern image information;

obtaining a plurality of finger gap key points based on the biometric pattern information, wherein the plurality of finger gap key points comprise a first key point, a second key point, and a third key point, the first key point is between an index finger and a middle finger of a palm, the second key point is between the middle finger and a ring finger of the palm, and the third key point is between the ring finger and a little finger of the palm;

establishing a rectangular coordinate system in the biometric pattern information, wherein a direction from the third key point to the first key point is a positive direction of an x-axis of the rectangular coordinate system, a direction from an intersection point where a line perpendicular to the x-axis passing through the second key point intersects the x-axis to the second key point as a positive direction of a y-axis of the rectangular coordinate system;

determining a central point on the y-axis in a negative y-axis direction, wherein the central point is located on the negative y-axis direction at a particular ratio of a distance from the first key point to the third key point;

determining a region of interest in the biometric pattern information based on the central point, the central point being at a center of the region of interest;

extracting information in the region of interest to obtain updated biometric pattern information;

performing feature extraction on the updated biometric pattern information to obtain a global pattern feature and a local pattern feature, the global pattern feature describing a global feature of the updated biometric pattern information of the first object, and the local pattern feature describing a local feature of the updated biometric pattern information of the first object;

fusing the global pattern feature and the local pattern feature of the first object to obtain a fused pattern feature of the first object; and performing identity recognition on the first object based on the fused pattern feature of the first object by comparing the fused pattern feature of the first object with a sample pattern feature to obtain an identity determination result of the first object, the sample pattern feature being used for describing a biometric pattern information feature of a target object, wherein comparing the fused pattern feature of the first object with the sample pattern feature comprises:

calculating a cosine similarity between the fused pattern feature and the sample pattern feature;

obtaining, in response to the cosine similarity satisfying an identity determination threshold, the identity determination result that the first object is the target object; and obtaining, in response to the cosine similarity not satisfying the identity determination threshold, the identity determination result that the first object is not the target object.

8. The computer device according to claim 7, wherein the one or more processors are further configured to perform:

performing hidden layer feature extraction on the biometric pattern information to obtain a texture hidden layer feature of the first object, the texture hidden layer feature describing a hidden layer representation of target palmprint information;

performing feature extraction on the texture hidden layer feature by a first feature extraction method to obtain the global pattern feature of the first object, the first feature extraction method including a feature dimensionality reduction-based feature extraction method; and performing feature extraction on the texture hidden layer feature by a second feature extraction method to obtain the local pattern feature of the first object, the second feature extraction method including a feature receptive field increase-based feature extraction method.

9. The computer device according to claim 8, wherein the one or more processors are further configured to perform:

respectively processing the texture hidden layer feature by n second feature extraction methods to obtain n local sub-features of the first object, n being a positive integer, and feature receptive fields of the n second feature extraction methods being different; and splicing the n local sub-features to obtain the local pattern feature of the first object.

10. The computer device according to claim 7, wherein the one or more processors are further configured to perform:

performing self-attention mechanism processing on the local pattern feature to obtain an updated local pattern feature; and fusing the global pattern feature and the updated local pattern feature of the first object to obtain the fused pattern feature of the first object.

11. The computer device according to claim 10, wherein the self-attention mechanism processing comprises an activation process and a regularization process; and the one or more processors are further configured to perform:

activating the local pattern feature to obtain a second activated feature;

regularizing the local pattern feature to obtain a second regularized feature; and multiplying the second activated feature by the second regularized feature to obtain the updated local pattern feature of the first object.

12. The computer device according to claim 7, wherein the one or more processors are further configured to perform:

performing interpolation for the biometric pattern information.

13. A non-transitory computer readable storage medium, storing executable instructions that, when being executed, causes one or more processors implement an identity recognition method by performing:

acquiring biometric pattern information describing a biometric pattern of a first object, the biometric pattern information including palm pattern image information;

obtaining a plurality of finger gap key points based on the biometric pattern information, wherein the plurality of finger gap key points comprise a first key point, a second key point, and a third key point, the first key point is between an index finger and a middle finger of a palm, the second key point is between the middle finger and a ring finger of the palm, and the third key point is between the ring finger and a little finger of the palm;

establishing a rectangular coordinate system in the biometric pattern information, wherein a direction from the third key point to the first key point is a positive direction of an x-axis of the rectangular coordinate system, a direction from an intersection point where a line perpendicular to the x-axis passing through the second key point intersects the x-axis to the second key point as a positive direction of a y-axis of the rectangular coordinate system;

determining a central point on the y-axis in a negative y-axis direction, wherein the central point is located on the negative y-axis direction at a particular ratio of a distance from the first key point to the third key point;

determining a region of interest in the biometric pattern information based on the central point, the central point being at a center of the region of interest;

extracting information in the region of interest to obtain updated biometric pattern information;

performing feature extraction on the updated biometric pattern information to obtain a global pattern feature and a local pattern feature, the global pattern feature describing a global feature of the updated biometric pattern information of the first object, and the local pattern feature describing a local feature of the updated biometric pattern information of the first object;

fusing the global pattern feature and the local pattern feature of the first object to obtain a fused pattern feature of the first object; and performing identity recognition on the first object based on the fused pattern feature of the first object by comparing the fused pattern feature of the first object with a sample pattern feature to obtain an identity determination result of the first object, the sample pattern feature being used for describing a biometric pattern information feature of a target object, wherein comparing the fused pattern feature of the first object with the sample pattern feature comprises:

calculating a cosine similarity between the fused pattern feature and the sample pattern feature;

obtaining, in response to the cosine similarity satisfying an identity determination threshold, the identity determination result that the first object is the target object; and obtaining, in response to the cosine similarity not satisfying the identity determination threshold, the identity determination result that the first object is not the target object.

14. The storage medium according to claim 13, wherein the one or more processors are further configured to perform:

performing hidden layer feature extraction on the biometric pattern information to obtain a texture hidden layer feature of the first object, the texture hidden layer feature describing a hidden layer representation of target palmprint information;

performing feature extraction on the texture hidden layer feature by a first feature extraction method to obtain the global pattern feature of the first object, the first feature extraction method including a feature dimensionality reduction-based feature extraction method; and performing feature extraction on the texture hidden layer feature by a second feature extraction method to obtain the local pattern feature of the first object, the second feature extraction method including a feature receptive field increase-based feature extraction method.

15. The storage medium according to claim 14, wherein the one or more processors are further configured to perform:

respectively processing the texture hidden layer feature by n second feature extraction methods to obtain n local sub-features of the first object, n being a positive integer, and feature receptive fields of the n second feature extraction methods being different; and splicing the n local sub-features to obtain the local pattern feature of the first object.

16. The storage medium according to claim 13, wherein the one or more processors are further configured to perform:

performing self-attention mechanism processing on the local pattern feature to obtain an updated local pattern feature; and fusing the global pattern feature and the updated local pattern feature of the first object to obtain the fused pattern feature of the first object.

* * * * *